United States Patent
Mullen et al.

(10) Patent No.: US 10,031,288 B2
(45) Date of Patent: Jul. 24, 2018

(54) OPTICAL STRUCTURES AND HYPERUNIFORM DISORDERED MATERIAL

(71) Applicant: Etaphase, Incorporated, Redmond, WA (US)

(72) Inventors: Ruth Ann Mullen, Bellevue, WA (US); Marian Florescu, Guildford, GA (US); Milan M. Milosevic, Svilajnac (RS)

(73) Assignee: Etaphase, Inc., Redmond, WA (US)

( * ) Notice: Subject to any disclaimer, the term of this patent is extended or adjusted under 35 U.S.C. 154(b) by 0 days.

(21) Appl. No.: 15/653,311

(22) Filed: Jul. 18, 2017

(65) Prior Publication Data
US 2017/0315292 A1 Nov. 2, 2017

Related U.S. Application Data

(62) Division of application No. 14/642,498, filed on Mar. 9, 2015, now Pat. No. 9,720,172.

(60) Provisional application No. 61/949,703, filed on Mar. 7, 2014, provisional application No. 61/949,717, filed on Mar. 7, 2014.

(51) Int. Cl.
*H04B 10/40* (2013.01)
*G02B 6/122* (2006.01)
*G02F 1/025* (2006.01)

(52) U.S. Cl.
CPC ............ *G02B 6/122* (2013.01); *G02F 1/025* (2013.01); *H04B 10/40* (2013.01)

(58) Field of Classification Search
CPC .......... H04B 10/40; G02B 6/122; G02F 1/025
USPC ........................................................ 398/135
See application file for complete search history.

(56) References Cited

U.S. PATENT DOCUMENTS

| 9,885,806 B2 * | 2/2018 | Steinhardt | G02B 1/005 |
| 2014/0016181 A1 * | 1/2014 | Dal Negro | G02B 5/008 359/298 |
| 2014/0264400 A1 * | 9/2014 | Lipson | H01L 27/144 257/88 |

OTHER PUBLICATIONS

Takasumi Tanabe, "Low power and fast electro-optic silicon modulator with lateral p-i-n embedded photonic crystal nanocavity", Dec. 7, 2009, Optics Express, vol. 17, No. 25.*

* cited by examiner

*Primary Examiner* — Dalzid Singh
(74) *Attorney, Agent, or Firm* — Boswell IP Law; Aaron J. Visbeek

(57) ABSTRACT

An optical structure and a system includes a Hyperuniform Disordered Solid ("HUDS") structure and a waveguide. The HUDS structure is formed by walled cells organized in a lattice.

20 Claims, 26 Drawing Sheets

299

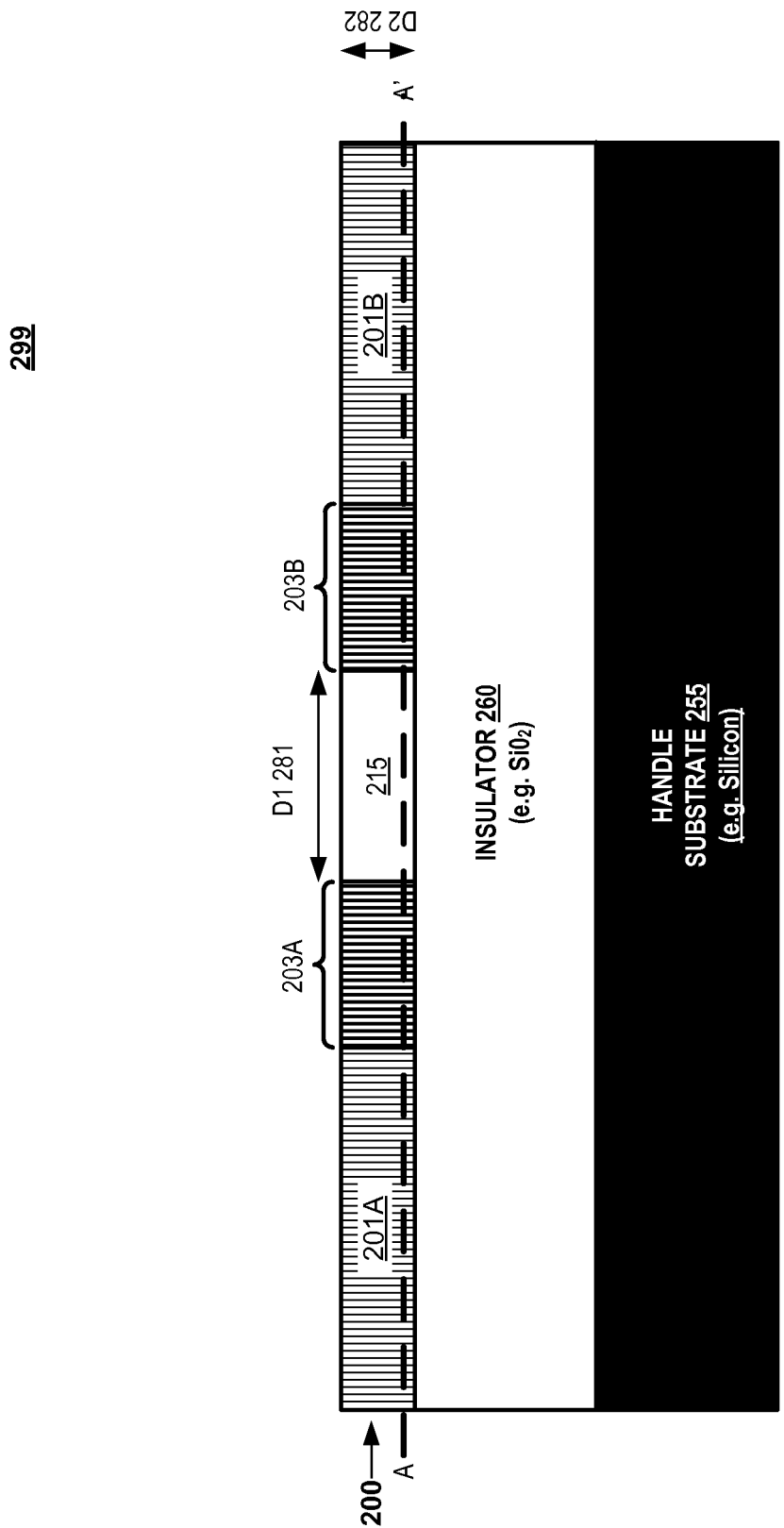

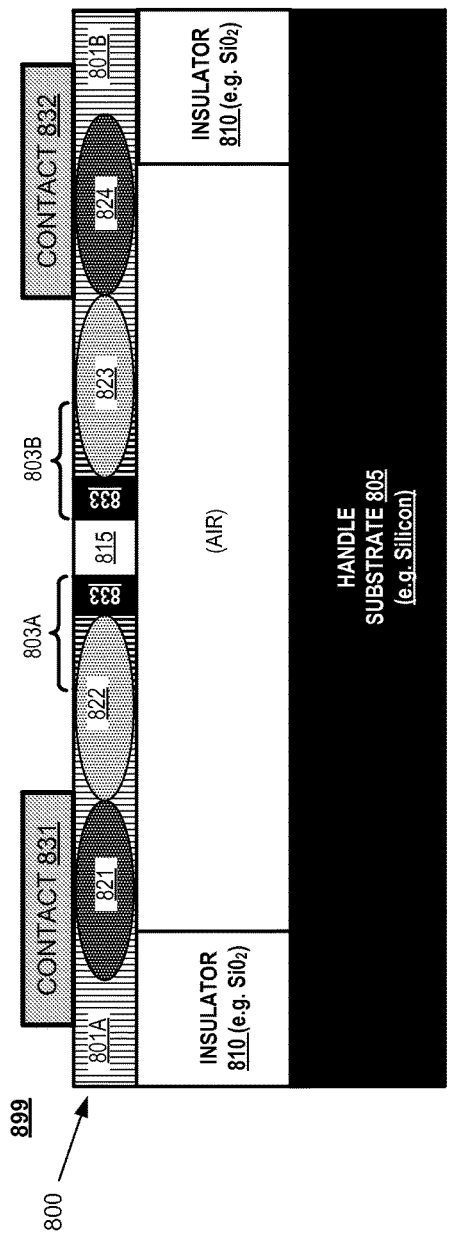
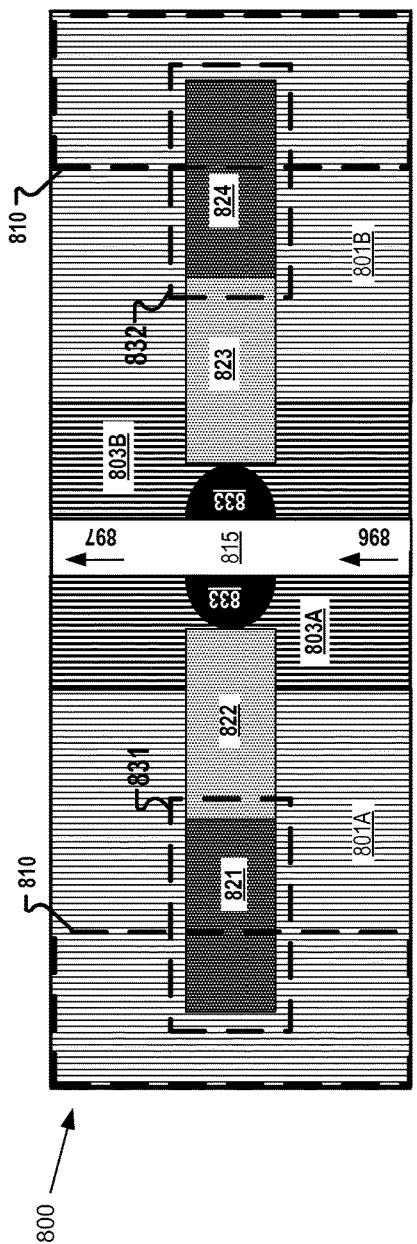
FIG. 8A
FIG. 8B

OPTICAL STRUCTURES AND HYPERUNIFORM DISORDERED MATERIAL

RELATED APPLICATIONS

This application claims priority to pending U.S. Nonprovisional application Ser. No. 14/642,498 filed Mar. 9, 2015, which is hereby incorporated by reference and claims priority to U.S. Provisional Applications No. 61/949,703 and No. 61/949,717, which were both filed Mar. 7, 2014 and are also hereby incorporated by reference.

Pending U.S. Non-provisional application Ser. No. 14/642,498 is related to non-provisional applications entitled, "Hyperuniform Disordered Structures with Improved Waveguide Boundaries" (U.S. Ser. No. 14/642,494) and "Hyperuniform Disordered Material with Perforated Resonant Structures," (U.S. Ser. No. 14/642,519) filed Mar. 9, 2015 which are also hereby incorporated by reference.

TECHNICAL FIELD

This disclosure relates generally to Hyperuniform Disordered Solid structures, and in particular, but not exclusively to optical waveguides.

BACKGROUND INFORMATION

Conventional data networks are bumping up against physical limitations as the demand for higher bit rates increases. The physical limitations include size, thermal considerations, and transmission speed. Optical networks are becoming increasingly important as they mitigate some of the physical limitations of conductively wired (e.g. copper) networks. Highly compact optical waveguides and filters facilitate the high bit rate transmission of information within and between computers.

Conventional planar waveguide systems, typically based on air-clad, oxide-clad, or nitride-clad structures such as rectangular strip, rib, and slot waveguides, support the design, fabrication, and planar integration of the full set of photonic components required to create photonic integrated circuits (PICs) for current applications to sensing, communications, and optical networking. The bending radius of such structures varies from hundreds of microns for the lowest-loss waveguides to several microns for some of the most tightly-bending, and substantially lossier waveguides. These conventional strip, rib, and slot waveguides have been formed into rings, Archimedean spirals, and the complex waveguide delay patterns increasingly used in chip-scale photonic implementations of complex optical coding schemes such as DPSK, DQPSK, and OAM (a.k.a. spatial division multiplexing, or vortex wave multiplexing). These and other complex photonic integrated circuit layouts have all been demonstrated using conventional planar waveguides. However, waveguide size constraints in conventional PICs limits reduction of the physical dimensions of the PICs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 2C shows an example structure that includes an optical structure, in accordance with an embodiment of the disclosure.

FIGS. 8A and 8B illustrate a HUDS based optical modulator that can be included in a photonic integrated circuit ("PIC"), in accordance with an embodiment of the disclosure.

DETAILED DESCRIPTION

Figure 1A:
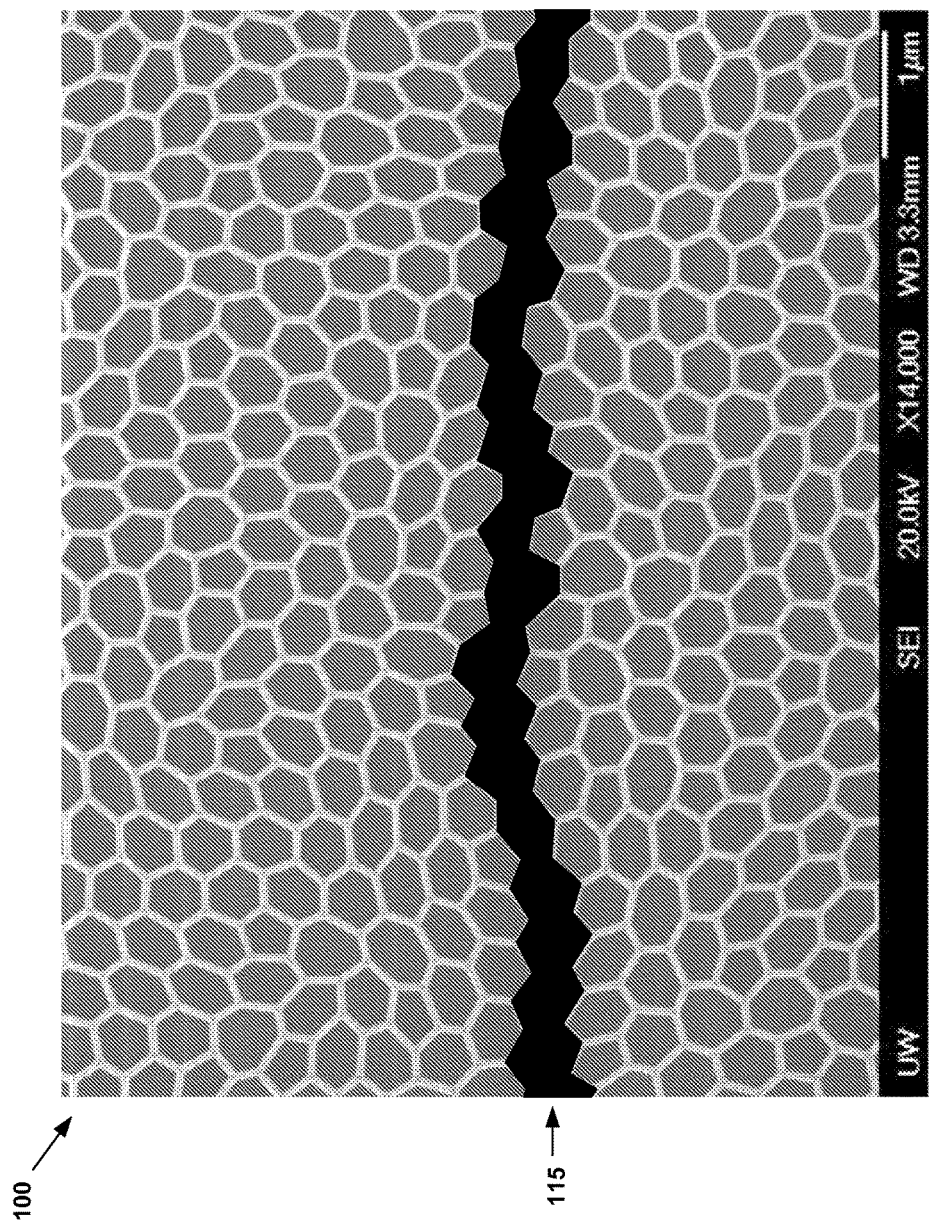
FIG. 1A shows a Hyperuniform Disordered Solid ("HUDS") structure that includes walled cells organized in a lattice.

Embodiments of Hyperuniform Disordered ("HUD") structures and systems including HUD structures are described herein.

In one embodiment of the disclosure, an arbitrarily-shaped waveguide is created by using the edges of the waveguide as one of the boundary conditions for the creation of a hyperuniform point pattern in the vicinity around the waveguide.

In another embodiment of the disclosure, an arbitrarily-shaped waveguide is created by first drawing the desired path of the waveguide through a pre-determined HUDS pattern without regard to whether or not the drawn path aligns with the original features in the HUDS pattern, then adjusting the HUDS features immediately adjacent to the waveguide so as to restore the hyperuniformly disordered packing pattern along the boundary of the waveguide path. Then, the HUDS points (and their associated walls) at the next row away from the boundary are adjusted.

In another embodiment of the disclosure, a HUDS-based photonic integrated circuit (PIC) forms an optical transmitter. Optical transmitters are known to comprise one or more light sources such as lasers, modulators, optional wavelength combiners, and optional intensity controllers. Each of these components can be made using HUDS, and can advantageously be either monolithically or hybridly integrated onto a single HUDS-based PIC. For the light source in the optical transmitter, HUDS can, for example, be designed into a III-V material system to confine light in an LED or laser gain medium, they hybridly integrated with another PIC made out of a material other than a III-V, such as silicon. Another way to use HUDS to confine light in an LED or laser gain medium is to design HUDS into a substrate such as silicon so as to create a high Q resonant cavity in the silicon which is evanescently-coupled to a III-V-based or other optical gain medium. Alternatively, a conventional non-HUDS-based light source can be hybridly-coupled into a HUDS-based photonic integrated circuit (PIC) via any number of coupling techniques known in the art, such as edge couplers and vertical couplers. A HUDS-based vertical coupler provides improved angular tolerance over vertical couplers based on periodic structures. Once coupled into the PIC, a HUDS-based waveguide carries the signal to a HUDS-based modulator. HUDS-based modulators can be either resonant or non-resonant.

In further embodiments of the invention, substantial performance improvements can be achieved in the use of HUDS-based photonic band gap structures to lay out photonic integrated circuits featuring rings, Archimedean spirals, and the complex waveguide delay patterns increasingly used in chip-scale photonic implementations of complex optical coding schemes such as DPSK, DQPSK, and OAM (a.k.a. spatial division multiplexing, or vortex wave multiplexing).

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Photonic Band Gap (PBG) solids are artificial dielectric materials used to "Mold the Flow of Light," and analogous in some respects to how semiconductors are used in electronic applications. While PBG solids are made from common materials such as, for example, silicon and air, their optical properties differ substantially from the optical properties of either silicon or air, in accordance with the geometric arrangement of the silicon and air at a size scale that is small relative to the wavelength of light. For example, a PBG structure can be designed and fabricated to prohibit the flow of light, even though it is made out of two materials which are each transparent to light. Such a PBG can be used as an optical insulator or mirror which forces light to remain confined in waveguides defined by the edges of the PBG material. PBG materials are typically a latticework of two interpenetrating substances with different indices of refraction (e.g., silicon and air), arranged in unit cells dimensioned on the order of a half a wavelength of the radiation to be controlled. For certain arrangements of materials, the solid has a complete PBG, a range of frequencies for which electromagnetic wave propagation is prohibited for all directions and polarizations. A complete PBG (analogous to an electronic band gap in a semiconductor) is the key feature needed for many technological applications, including efficient radiation sources, telecommunications devices (optical fibers and waveguides, T-branches, channel-drops, etc.), sensors, and optical computer chips.

Increasingly complex PBG-based photonic components which have been designed, fabricated and tested based on periodic PBG systems include waveguides, n-way splitters, resonant and non-resonant filters including super-prisms, beam combiners, vertical couplers, LEDs, lasers, modulators, switches, and detectors. Integrated together, these components have been combined into complex systems or subsystems including but not limited to transmitters, receivers, and sensors.

Periodicity of the sub-wavelength unit cells making up the PBG lattice was long thought to be a requirement for obtaining a photonic band gap. Quasiperiodic lattices designed to have a photonic band gap were subsequently invented. The layout of waveguides in conventional (periodic) Photonic Crystal (PhC) and Photonic QuasiCrystal (PhQC) PBG materials was tightly constrained to follow the PhC and PhQC crystal axes.

Applications in which compact, energy-efficient, and low-cost optical waveguides and filters are increasingly useful include internet applications involving cloud computing, social networking, communications, entertainment, retail services, gaming, electronic trading, and advertising via wireless, wireline, and/or fiber optical interconnects such as Fiber To The Home (FTTH), Fiber To The Premise (FTTP), or more generally Fiber To The X (FTTX).

A limitation of conventional PICs is that they have a component packing density limited by the relatively long-range evanescent coupling of light out of the single-mode waveguides, leading to a minimum "bending radius" for the waveguides below which optical losses associated with the bend are considered untenable. Waveguide size constraints in conventional PICs limits reduction of the physical dimensions of the PICs.

However, a new class of disordered photonic solids with large complete band gaps, namely, hyperuniform non-crystalline disordered solids, or "HUDS" was invented as claimed in WO2011/005530, which is hereby incorporated by reference. These new PBG materials, characterized by suppressed density fluctuations (hyperuniformity), include disordered structures that are isotropic. This means that light propagates the same way through the photonic solid independent of direction (which is impossible for a photonic crystal). Experiments on a single 2d HUDS tile indicated that these structures exhibited complete isotropic photonic band gaps as detailed in WO2013/055503, which is also incorporated by reference.

Figure 1B:
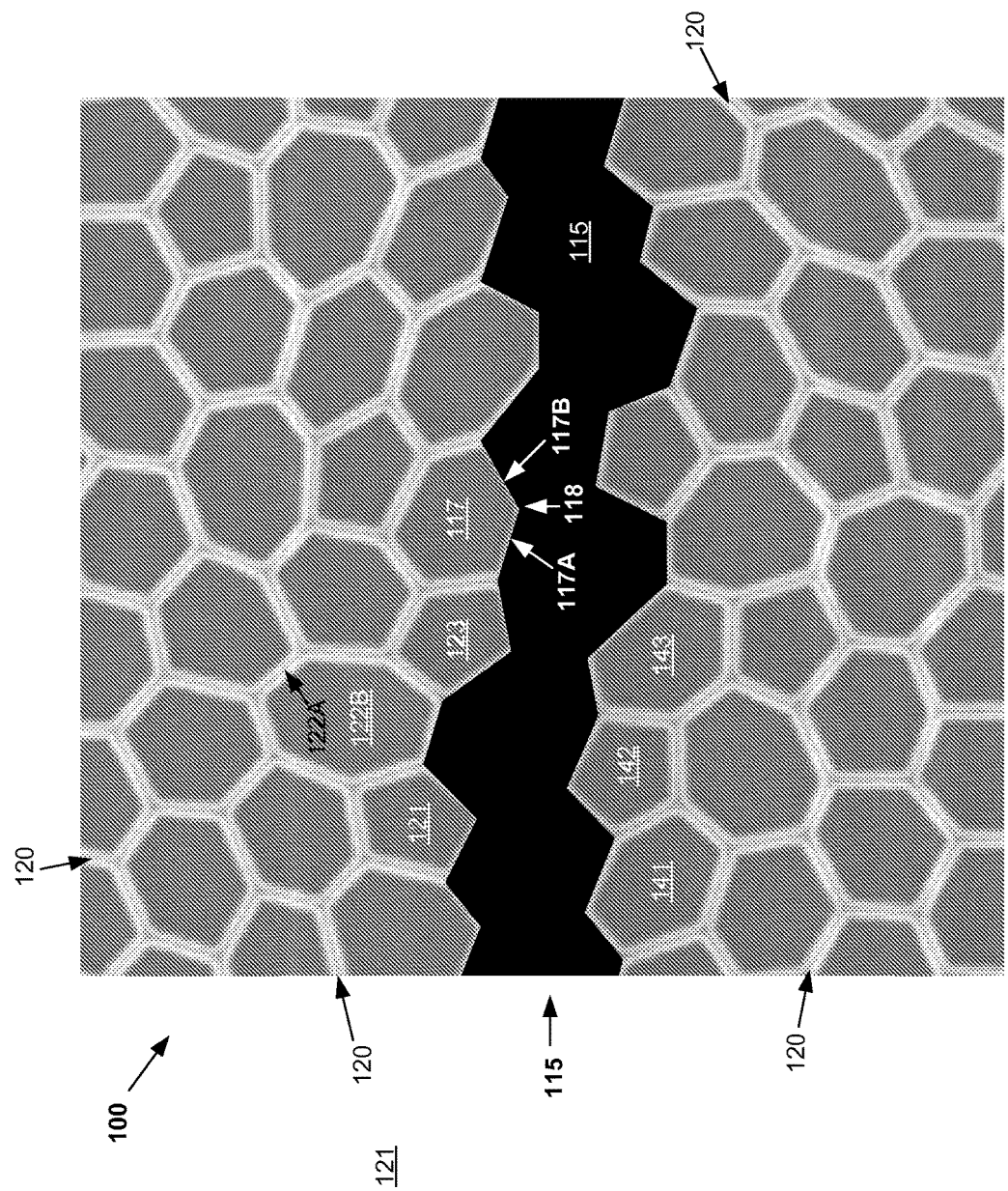
FIG. 1B shows a zoomed in view of a HUDS structure and a waveguide included in FIG. 1A.

FIG. 1A shows a HUDS structure 100 that includes walled cells organized in an aperiodic lattice. A waveguide 115 is formed through HUDS structure 100. FIG. 1B shows a zoomed-in view of structure 100 and waveguide 115. FIG. 1B shows that walled cells (e.g. 121, 122, 123, 141, 142, and 143) are organized in a non-periodic lattice structure 120 that adheres to HUDS design requirements. Each walled cell includes walls surrounding a void. The void may be filled with air, a vacuum, or a material other than air. For example, walled cell 122 includes walls 122A enclosing a void 122B, which is designed to be filled with air in FIG. 1B. Although not specifically illustrated, walled cell 121 also includes walled cells 121A and void 121B. Example walled cells 123, 141, 142, 143 as well as the unlabeled walled cells that form lattice 120 in FIGS. 1A and 1B are similarly constructed.

Waveguide 115 was formed by creating a series of adjacent "defects" in a pre-designed HUDS tile structure. In other words, waveguide 115 was specifically created by filling-in adjacent voids in adjacent walled cells. For example, if lattice 120 was made of silicon, adjacent cells were filled with silicon so that waveguide 115 is a contiguous silicon waveguide structure.

Figure 2A:
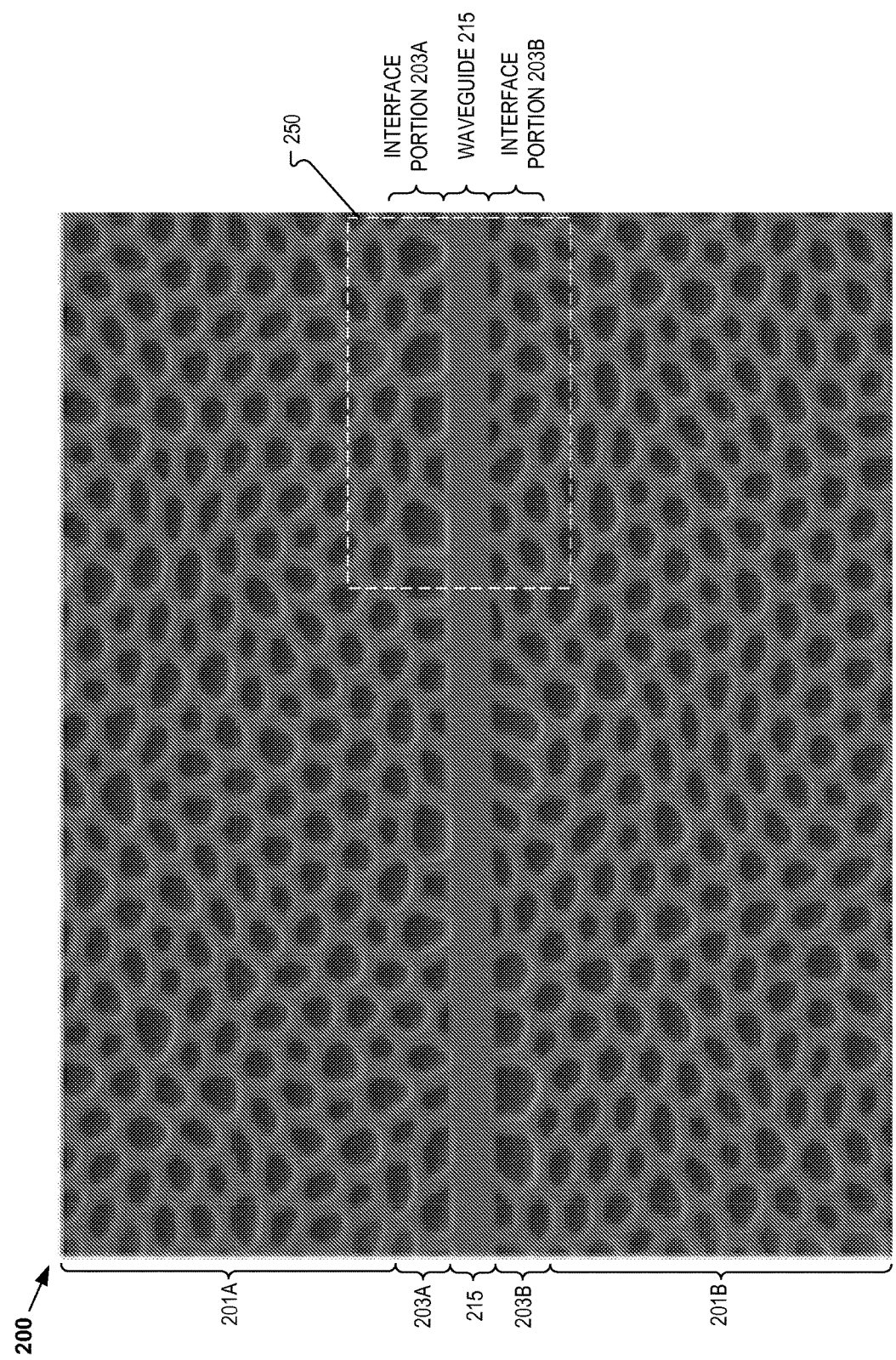
FIG. 2A illustrates an example of an optical structure that includes walled cells organized in a lattice, in accordance with an embodiment of the disclosure.

FIG. 2A illustrates an example of an optical structure 200 that includes walled cells organized in a lattice 230, in accordance with an embodiment of the disclosure. A waveguide 215 is formed through optical structure 200. Optical structure 200 includes HUDS structure portions 201A and 201B, adjusted interface portions 203A and 203B, and waveguide 215. Adjusted interface portion 203A is disposed between HUDS structure 201A and waveguide 215 and adjusted interface portion 203B is disposed between HUDS structure 201B and waveguide 215.

Figure 2B:
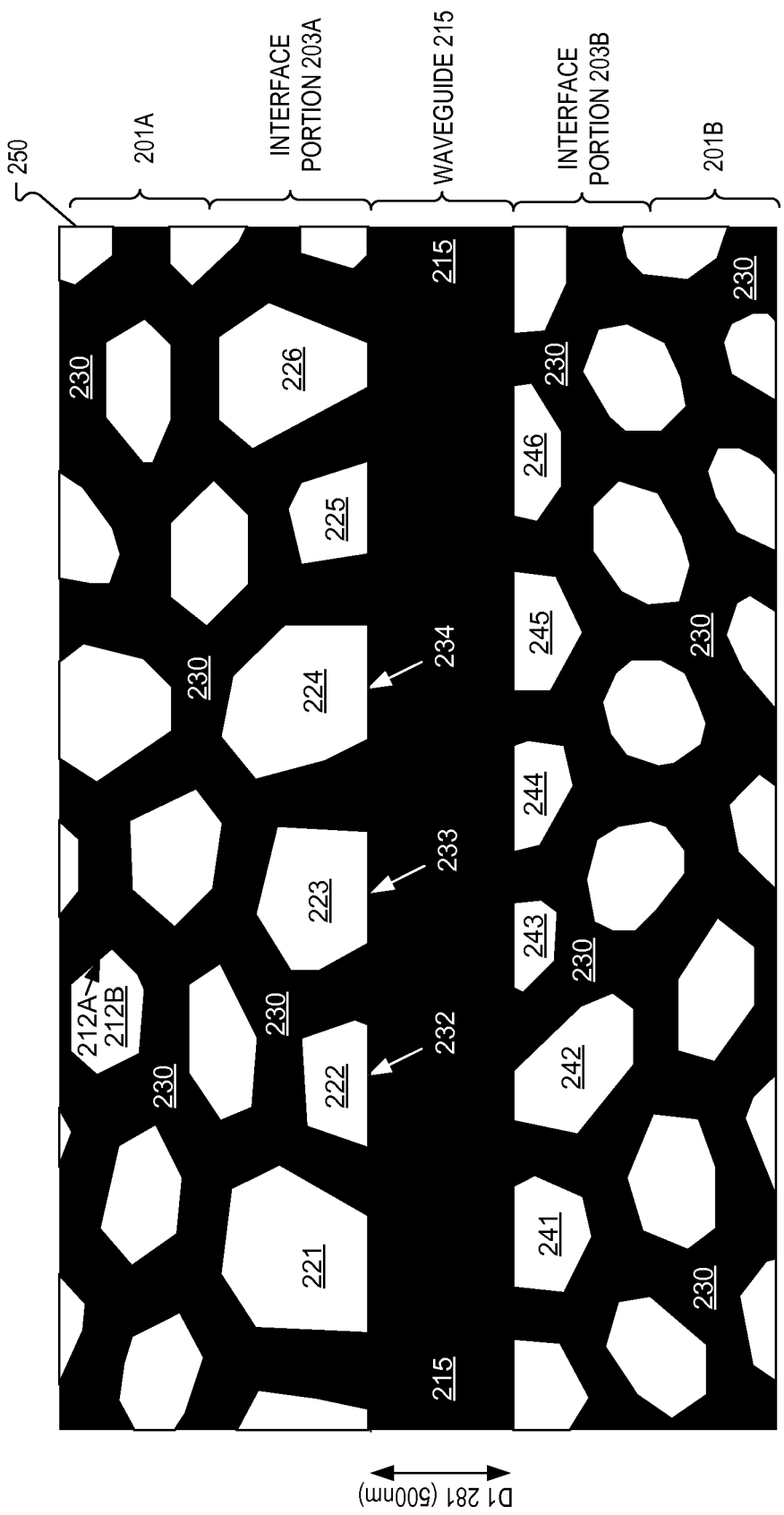
FIG. 2B shows a diagram of a zoomed-in portion of FIG. 2A, in accordance with an embodiment of the disclosure.

FIG. 2B shows a diagram of a zoomed-in portion 250 of FIG. 2A, in accordance with an embodiment of the disclosure. FIG. 2B shows that walled cells (e.g. 212, 221, 222, 223, 241, 242, and 243) are organized in a non-periodic lattice structure 230 that adheres to HUDS design requirements. In one embodiment, waveguide 215 and lattice structure 230 are formed of the same material (e.g. silicon) in a contiguous structure. The walled cells that make up lattice 230 include walls surrounding a void. The void may be filled with air, a vacuum, or another material. For example walled cell 212 includes walls 212A enclosing a void 212B, which is filled with air in FIG. 2B. Hence, voids (e.g. void 212B) in walled cells may be described as an air hole when air fills a void in a walled cell. HUDS structure portions 201A and 201B include walled cells that are purely "HUDSian" in that they conform to HUDS design requirements. However, the walled cells in adjusted interface portions 203A and 203B (e.g. 212, 221, 222, 223, 241, 242, and 243) are adjusted relative to their design prior to definition of the waveguide to facilitate a smooth boundary of waveguide 215 and do not necessarily strictly adhere to HUDSian design principles. In one embodiment, waveguide 215 shown as solid in FIGS. 2A and 2B is a photonic crystalline or photonic quasicrystalline waveguide comprising one or more rows of periodic or quasiperiodic elements. Adjusted interfaces 203A and 203B transition in this embodiment from a periodic or quasiperiodic pattern on the smooth boundaries of waveguide 215 to a hyperuniform disordered pattern at an interface between the HUD structure 201A and 201B and the adjusted interfaces 203A and 203B. It is understood that the brackets that indicate the position of adjusted interfaces 203A and 203B and HUDS structures 201A and 201B are rough indicators of their position, as their positions may not necessarily be defined by straight lines and instead may be defined walled cell-by-walled cell. In FIG. 2B, adjusted interface portions 203A and 203B are one walled cell deep and only includes the walled cells that contact waveguide 215. However, in other embodiments, the adjusted interface portion may be two or more walled cells deep. In other words, the transition between HUDS structure 201A and waveguide 215 may take place over two or more walled cells in order to further improve the performance of waveguide 215, in terms of the efficiency with which it transmits light, the spectral shape of its transmittance, the spectral dispersion of its transmittance, and/or other waveguide performance characteristics.

Figure 4:
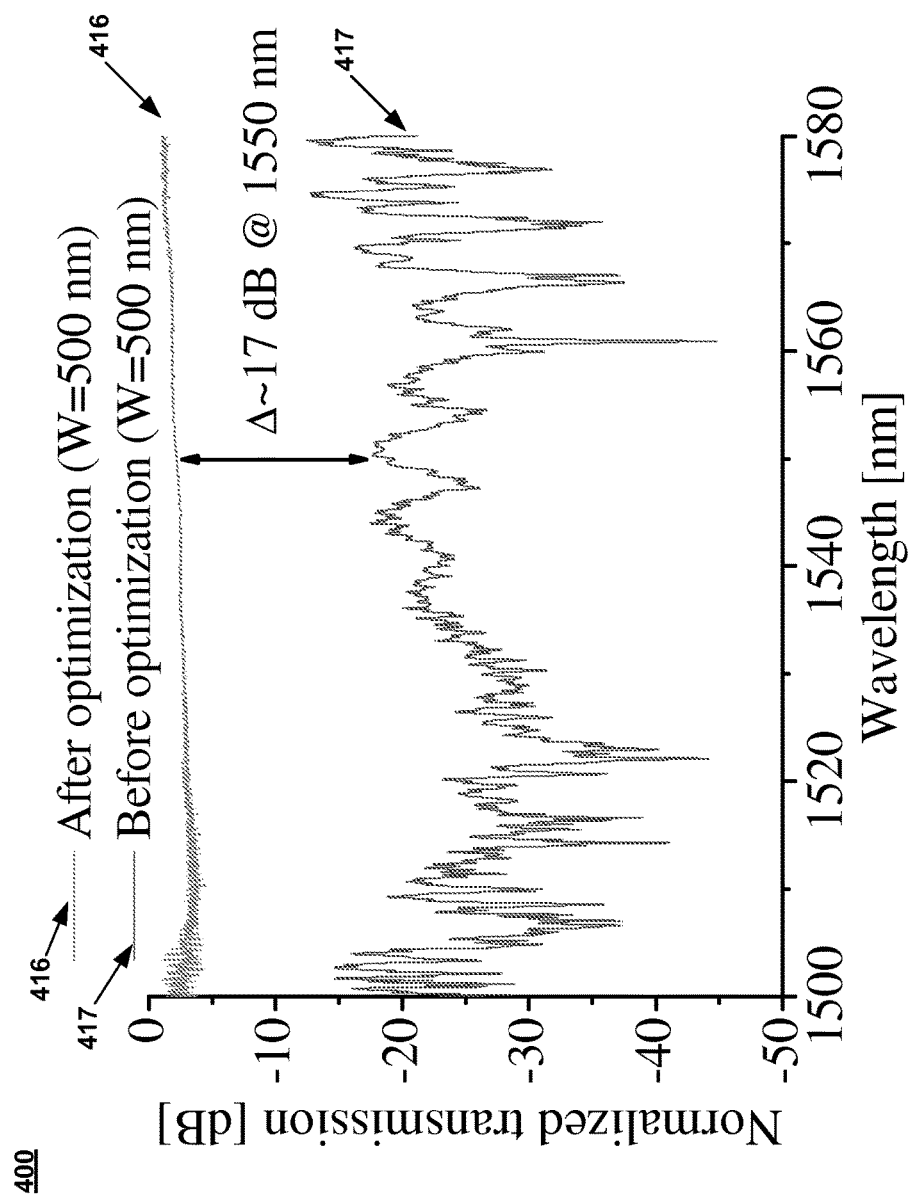
FIG. 4 shows the efficiency of the waveguide from FIG. 2A, in accordance with an embodiment of the disclosure.

FIG. 4 shows that waveguide 215 was shown to be more efficient than waveguide 115, as data 416 (associated with waveguide 215) shows better transmission efficiency than data 417 (associated with waveguide 115), in chart 400. Chart 400 in FIG. 4 shows that the testing was completed for optical signals in a near-infrared wavelength from 1500 nm to 1580 nm, experimentally comparing the waveguide transmission spectra for waveguides before and after the above-described design improvements at the waveguide interface. Experiments were found consistent with numerical simulation of the waveguide transmission spectra of structures such as 100 and 200, using Lumerical software. Lumerical's 2.5D eigenvalue eigenmode expansion (EME) solver MODE Solutions, Lumerical's fully 3D "FDTD Solutions" software package, Lumerical's 3D FEM "DEVICE" software package, open source code such as MIT's MEEP, and other software packages are applicable to simulating optical performance, for example.

Referring back to FIG. 2B, the smooth boundaries of waveguide 215 enclose walled interface cells 221-226 and 241-246. Walled interface cells for the purposes of this disclosure are defined as the walled cells that contact the waveguide. Cell wall 232 is a wall of walled interface cell 222 and encloses the void included in cell 222. Cell wall 232 also defines and is integrated into a portion of the smooth boundary of waveguide 215. The smooth boundary of waveguide 215 is smooth when compared with the jagged waveguide boundary of waveguide 115. For example, in FIG. 1B, boundary 117A and 117B (also functioning as the walls of walled cell 117) intersect at point 118. Boundary 117A is not parallel or close to parallel to boundary 117B. Rather boundary 117A is approximately 30 degrees from parallel with boundary 117B. Additionally, cell 117 has two distinct walls that intersect at point 118. In FIG. 2B, walled interface cell 223 has smooth wall 233 that is a straight line and functions as the boundary of waveguide 215 and as a wall of 233. Wall 233 does not come to a point. Walled interface cell 222 is adjacent to walled interface cell 223. Wall 232 of walled interface cell 222 is parallel with wall 233 of walled interface cell 223, in the illustrated embodiment. In FIGS. 2A and 2B, the smooth boundaries of waveguide 215 are straight. However, curved and arbitrary waveguides can also be fabricated that also have smooth boundaries, in accordance with the teachings of the present disclosure.

FIG. 2C shows a side view of example structure 299 that includes the finite height perforated optical structure 200, in accordance with an embodiment of the disclosure. Structure 299 includes insulator layer 260 disposed between handle substrate layer 255 and optical structure 200. FIG. 2C shows a cross section of the optical structure 200 illustrated in FIG. 2A as FIG. 2A shows a view of optical structure 200 through line A-A' in FIG. 2C. FIG. 2C shows that a cross section of waveguide 215 is dimensioned D1 281×D2 282 and is rectangular, in FIG. 2A-2C. In one embodiment, dimension D1 281 is 500 nm and dimension D2 is 200 nm. D2 may be 204 nm or 220 nm in some embodiments. In some embodiments, portions of insulator layer 260 are removed beneath waveguide 215 to facilitate the desired light propagation in waveguide 215. In one embodiment, insulator layer 260 includes silicon-dioxide.

Structure 299 is one fabrication structure that may be utilized to fabricate optical structure 200 using CMOS fabrication techniques and available silicon-on-insulator ("SOI") materials. In one embodiment optical structure 200 is formed from a solid semiconductor layer (e.g. silicon) using a subtractive process. This allows HUDS structures to be used as cladding for silicon waveguides. In one embodiment, a SOI wafer with 220 nm crystalline silicon height and a 2 um buried oxide layer is used to fabricate HUDS waveguides using standard electron beam lithography and inductively-coupled plasma reactive ion etching. Photolithography can also be used to fabricate HUDS waveguides.

Starting with a solid silicon layer, the voids in each walled cell can be subtracted (via etching process, for example) from the solid silicon layer, which leaves lattice 230 and waveguide 215 as a contiguous silicon structure. In one embodiment, the voids are left as air holes. In one embodiment, the voids are a vacuum. In one embodiment, the voids with the walled cells are filled with a material different from the material that forms lattice 230 and waveguide 215. In one embodiment, the voids are filled with a fill material having a first index of refraction that is different than an index of refraction of the material that forms the lattice 230 and waveguide 215. The fill material and the material forming lattice 230 may have oppositely-signed dependence of their indices of refraction on temperature. In other words, when temperature increases, the index of refraction of one material increases while the other index of refraction of the other material decreases. In one embodiment, the fill material includes titanium-dioxide and the lattice material is silicon. The index of refraction of titanium-dioxide decreases when temperature increases while the index of refraction of silicon increases when the temperature increases, thus titanium-dioxide and silicon have oppositely-signed dependence of their indices of refraction on temperature. This use of a fill material having an opposite and offsetting thermo-optic coefficient makes the optical performance characteristics of structures such as 200 more temperature stable. In one embodiment, the first index of refraction of the fill material is greater than air and less than the second index of refraction of the material that forms the walled cells in lattice 230. Silicon-dioxide may also be used as a fill material. Titanium-dioxide and silicon-dioxide can be disposed in the voids using known processes as these materials are commonplace in CMOS fabrication. In one embodiment, a nitride is used to fill voids. In other embodiments, layer 200 is another group V material such as germanium, or a combination of silicon and germanium, or another material. In other embodiments, layer 200 is a III-V material such as GaAs, GaInAs, or another III-V engineered material. In other embodiments layer 200 might be a polymer, a perovskite, another electrooptic material, or any number of other materials having an appropriate bulk dielectric constant and bulk optical transmittance. Other embodiments designed for operation at electromagnetic wavelengths outside the optical spectrum will use other materials having appropriate bulk real and imaginary dielectric constants appropriate to the wavelength of design. At microwave frequencies, for example, alumina is an example of a material having appropriate real and imaginary dielectric constants to be used as the walls of the structure. In other embodiments, the walls can be made out of commercial plastic materials that are used in 3d-printers.

In one embodiment, the walls are made of silicon, and the lattice constant of optical structure 200 is 499 nm, corresponding to a transverse-electric ("TE") polarization PBG with zero density-of-state centered around 1550 nm. The wall thickness of the walled cells in lattice 230 may be between 80 nm and 150 nm.

Figure 3A:
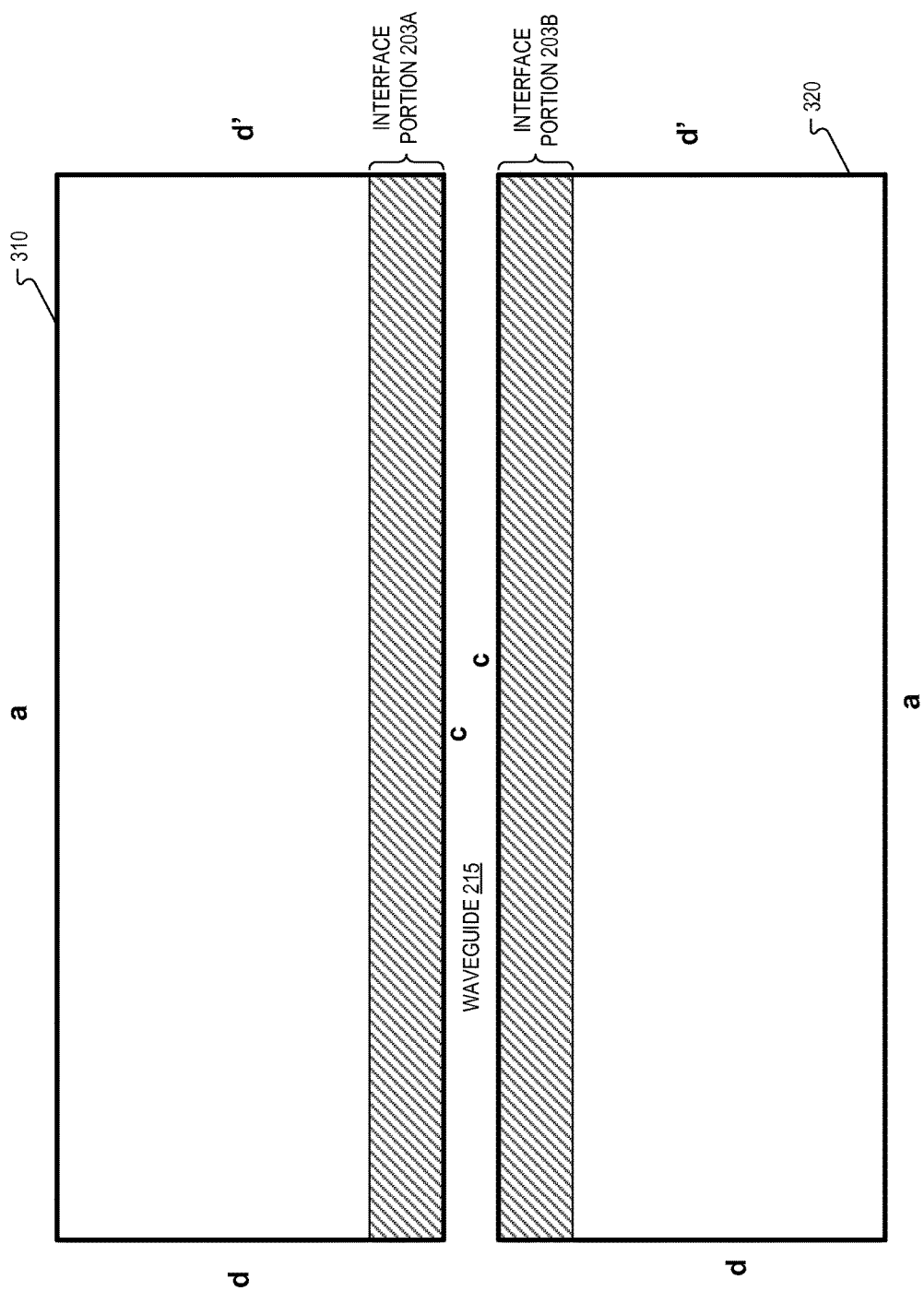
FIG. 3A illustrates boundaries for HUDS tile designs that can be used to generate an optical structure, in accordance with an embodiment of the disclosure.

FIG. 3A illustrates boundaries for HODS tile designs that can be used to generate optical structure 200, in accordance with an embodiment of the disclosure. The design of a HUDS tile (including tile section 310 and tile section 320) have a boundary condition along edge c which is optimized for a situation in which edge c is an edge of a straight waveguide such as waveguide 215. Edge a of the tile has a boundary condition set to match to an adjoining HUDS tile having a boundary condition a'. Edges d and d' have boundary conditions optimized so as to both enable straightforward intercnonnection of d and d' and to smoothly transition between the different boundary conditions along edge c and edge a.

One or more of several methods can be used in the optimization of the HUDS pattern. For example, one can optimize the HUDS pattern using waveguide transmission as the metric to determine the optimal pattern. In other situations, flatness of transmission across a particular wavelength range may be the preferable metric. In yet another situation, the preferable metric may be the quality factor or Q of a purposely-designed resonant cavity being used for example as a filter. In yet another situation, the preferable metric may be the modulation depth of a modulator. For a highly complex PIC such as a transceiver comprising waveguides, wavelength filters, modulators, and other components, the relevant metrics may be the bit rate and bit error rate (BER) of the transceiver. In some cases it can advantageously save significant numbers of computational cycles to initially compute, monitor, and minimize the on-axis power in the Fourier transform of the structure (which will approach zero as the structure becomes increasingly hyperuniform) prior to optimizing the HUDS structure with respect to the overall optical performance metrics of the photonic integrated circuit as a whole.

The boundary conditions for a HUDS structure is defined by tile section 310 and 320. Along the straight edge of waveguide 215 (edge c) a periodic (e.g. photonic crystalline) or quasi-periodic (e.g. photonic quasi-crystalline) pattern is applied in the adjusted interface portions 203A and 203B. As crystalline and quasi-crystalline patterns are both hyperuniform, they can both be blended into a hyperuniform disordered pattern in the purely HUDSian remainder of tile sections 310 or 320. The area shaded by the diagonal hatch lines is adjusted interface portions 203A and 203B in which the periodic or quasi-periodic pattern on edge c is transitioned from periodic or quasiperiodic to hyperuniform disordered. Boundary conditions along edges labelled d and d' are designed to facilitate both the transition from periodic or quasiperiodic to HUDS, and the smooth connection of edge d to edge d'.

Figure 3B:
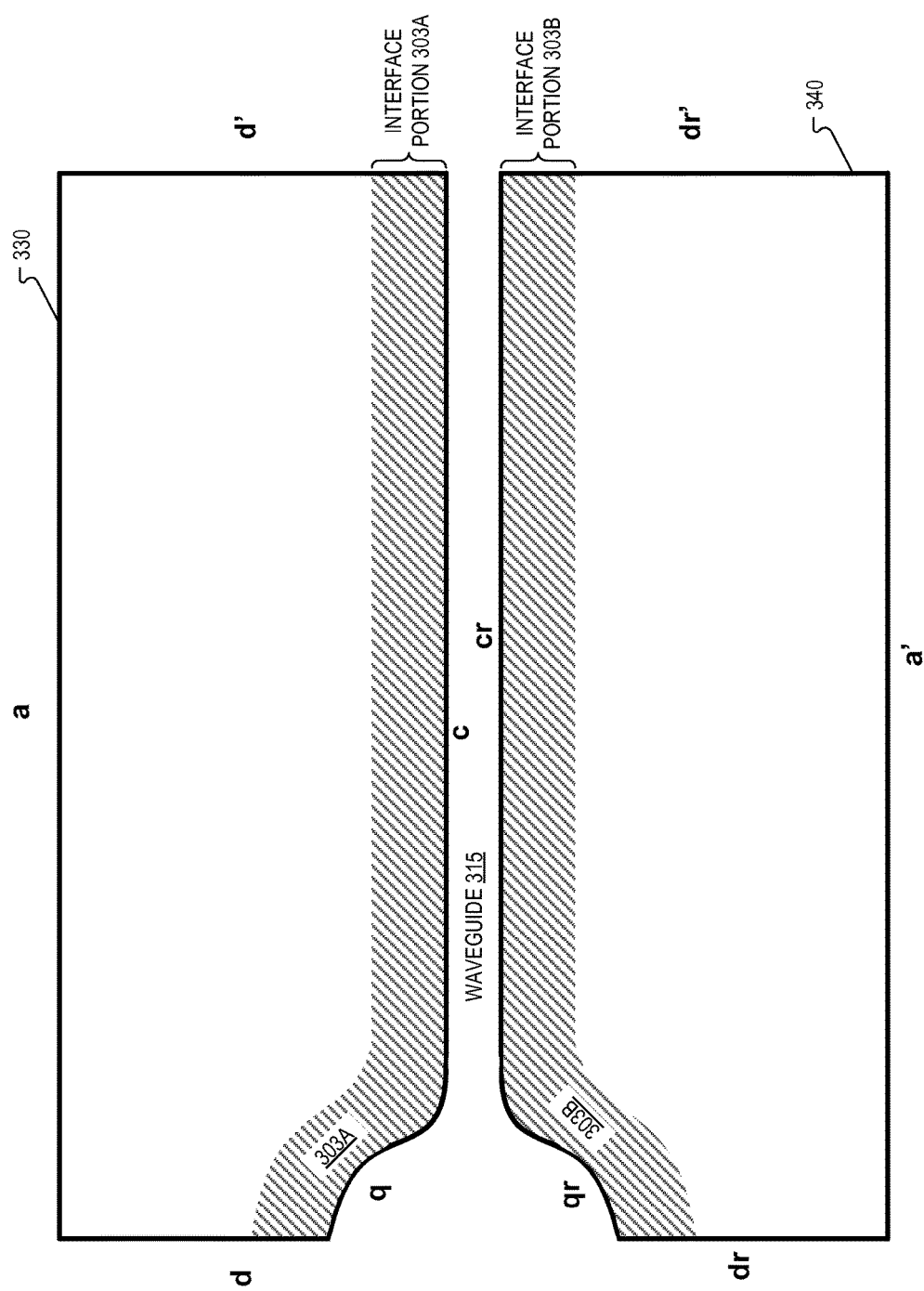
FIG. 3B illustrates a more complex boundary condition that might be used, for example, to create a particularly compact edge coupler, in accordance with an embodiment of the disclosure.

FIG. 3B illustrates a more complex boundary condition that might be used, for example, to create a particularly compact edge coupler, in accordance with an embodiment of the disclosure. The boundary condition in this case is designed to facilitate use of a bi-quadratically-flared edge coupler, narrowing-down to mate with a straight waveguide 315. Boundaries c and $c_r$ can in this case be mirrors of one another. Boundaries q and its mirror $q_r$ forms a quadratic or bi-quadratic taper, although FIG. 3B may not be an exact representation of a quadradic or bi-quadratic taper. Boundaries a and a' are designed to interconnect with one another. Boundary d is designed to interconnect with boundary d'. Boundary $d_r$ is designed to interconnect with $d_r'$. Tile section 330 is a HUDS structure, except for adjusted interface portion 303A, which is similar to adjusted interface portion 203A. Tile section 340 is a HUDS structure, except for adjusted interface portion 303B, which is similar to adjusted interface portion 203B. Both tapers and inverse tapers are possible depending on the shape of the taper, the relative dielectric constants of the walls and holes, and the design of the surrounding HUDS. The taper can also be engineered into the perforations around the waveguide.

Figure 3C:
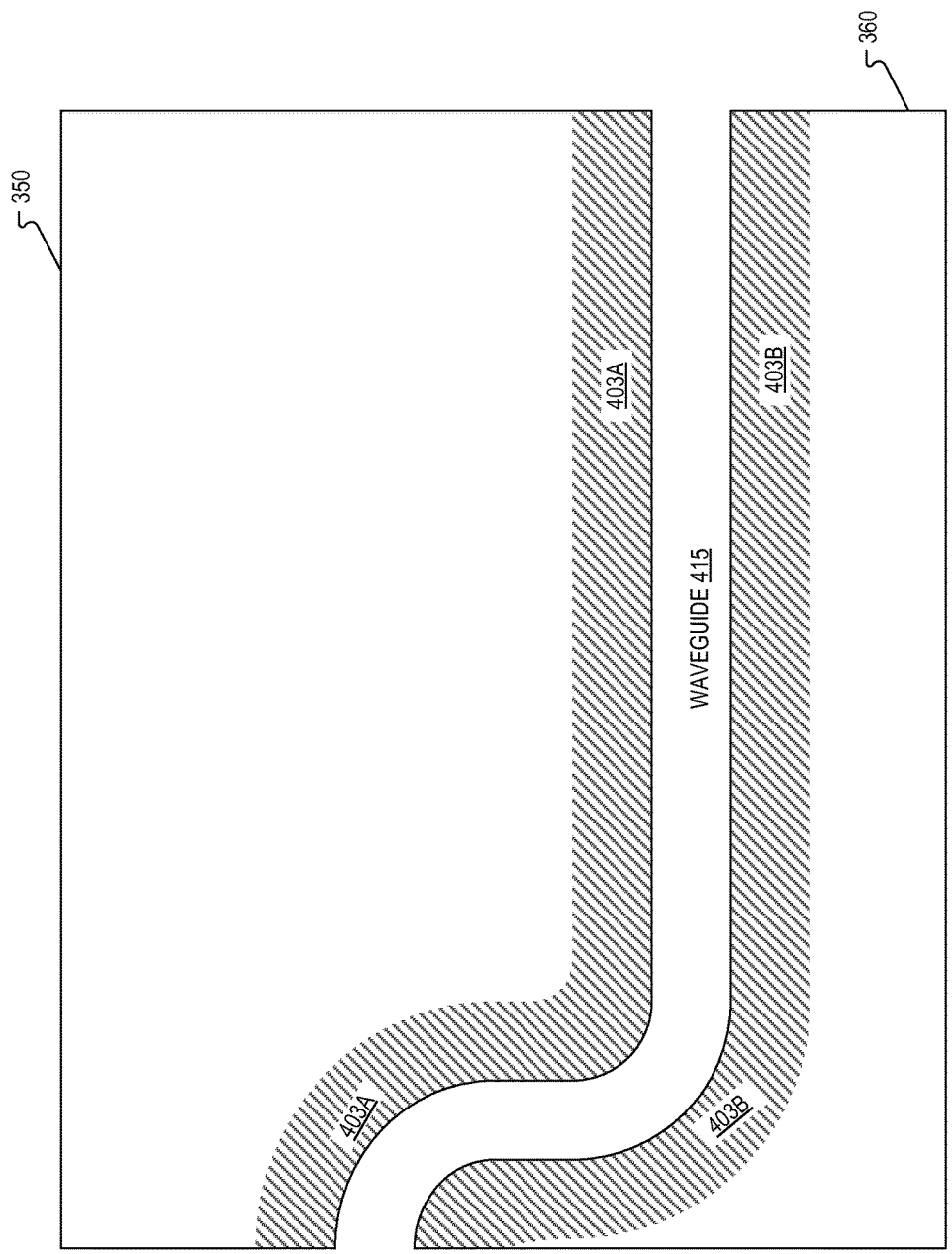
FIG. 3C shows a HUDS tile having tile sections, in accordance with an embodiment of the disclosure.

FIG. 3C shows a HUDS tile having tile sections 350 and 360, in accordance with an embodiment of the disclosure. The HUDS tile shown in FIG. 3C shows that arbitrarily-curved waveguide shapes such as waveguide 415 can be fabricated as well as straight waveguides 215. Tile section 350 is a HUDS structure, except for adjusted interface portion 403A, which is similar to adjusted interface portion 203A. Tile section 360 is a HUDS structure, except for adjusted interface portion 403B, which is similar to adjusted interface portion 203B.

In one example, to design the example HUDS tiles illustrated in FIGS. 3A-3C, the boundary of each of the tile sections are defined and a HUDS structure is generated for those boundaries by employing a centroidal tessellation of a hyperuniform point pattern to generate a "relaxed" dual lattice, whose vertices were necessarily trihedrally coordinated by construction. More details about the particular design is detailed in "Designer disordered materials with large complete photonic band gaps," M. Florescu, S. Torquato, and P. Steinhardt, Proc. Natl. Acad. Sci. USA 106, 20658 (2009), which is hereby incorporated by reference. Additionally, the descriptions disclosed in WO2011/005530 and WO2013/055503 may be used in designing the HUDS structures within the boundaries, both documents which are hereby incorporated by reference.

After a HUDS pattern or structure is generated using the boundary conditions of each tile section, the boundary nearest the edge of the waveguide is adjusted to generate the adjusted interface portions. It is appreciated that in FIG. 3A for example, the edge c is also the edge/boundary of waveguide 215, and thus, one of the edges of the waveguide is also a boundary condition of the HUDS structure that is generated initially. The adjusted interface portions can be generated by manually adjusting the initial HUDS structure at the edge of the waveguide at the design phase and then the designs can be simulated to discern the optical efficiency of the waveguide.

Alternatively the adjusted interface portions can be incrementally modified in a software program and then simulated to narrow in on a highly efficient structure for the adjusted interface portions.

Figure 5A:
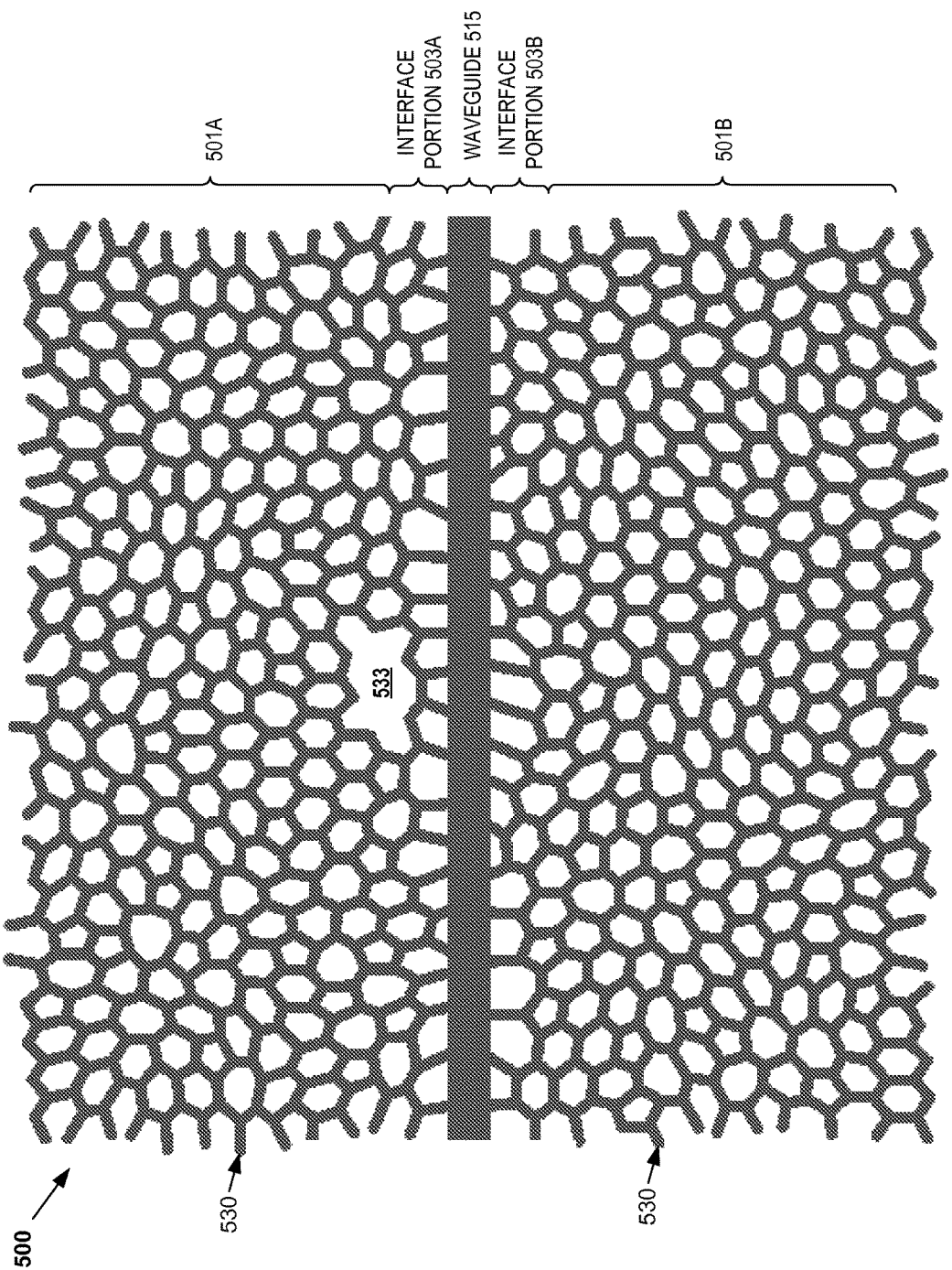
FIGS. 5A-5B illustrates an optical structure including an example resonant cavity, in accordance with an embodiment of the disclosure.

FIG. 5A illustrates an optical structure 500, in accordance with an embodiment of the disclosure. Optical structure 500 includes HUDS structures 501A and 501B formed by walled cells organized in a non-periodic lattice 530. Optical structure 500 also includes a waveguide 515 and a resonant cavity 533 formed by eliminating several walls in close proximity to a boundary of waveguide 515. In FIG. 5A, optical structure 500 also includes adjusted interface portions 503A and 503B. Further adjustments in the immediate vicinity of the resonant cavities can be formed in HUDS structures without necessarily having adjusted interface portions. In FIG. 5A, adjusted interface portion 503A is disposed between HUDS structure 501A and waveguide 515 and can be extended in the vicinity of resonant cavity 533 to surround resonant cavity with one or more rows of cells encircling the cavity.

Figure 5B:
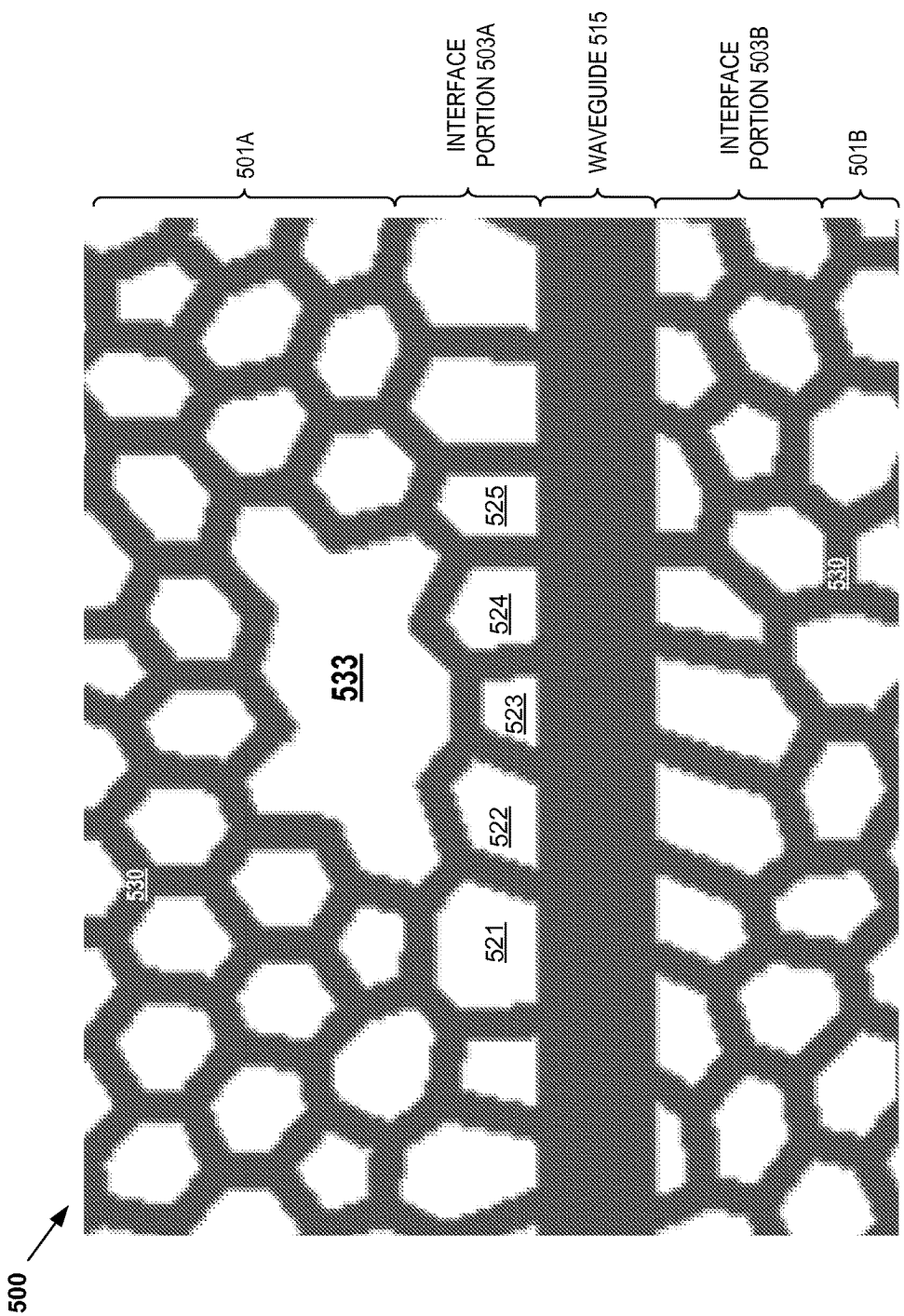

FIG. 5B shows a zoomed-in version of optical structure 500, in accordance with an embodiment of the disclosure. In FIG. 5B, adjusted interface portion 503A includes at least one row of walled interface cells (e.g. 521-525) disposed between waveguide 515 and HUDS structure 501A. Boundaries of waveguide 515 enclose walled interface cells that (e.g. 521-525) that are disposed at the boundary of the waveguide. In the illustrated embodiment, resonant cavity 533 is disposed between HUDS structure 501A and adjusted interface 503A. Waveguide 515 is dimensioned to transmit an optical signal having frequencies in a given bandwidth (e.g. 1500 nm to 1600 nm, 1300 nm to 1350 nm, or another wavelength band important to communications or ranging, including visible wavelengths in the event that the structure is made from a material with appropriate bulk transparency in the visible, THz wavelengths, microwave wavelengths, etc.) and resonant cavity 533 is configured to be resonant at a frequency band (e.g. a frequency band centered around 1552 nm) within the frequency of the bandwidth of the waveguide 515. In other words, resonant cavity 533 is configured to filter out a portion of the optical signal guided by waveguide 515. Resonant cavity 533 is made by forming a "defect" in the HUDS structure 501A by removing walls from some of the walled cells in lattice 530. In the illustrated embodiment, the walls of six walled cells were removed to form resonant cavity 533. In the illustrated embodiment, resonant cavity 533 is defined by an enlarged hole in lattice 530. The enlarged hole is larger than a hole size of any one of the walled cells in a defect-free portion of the lattice where walls of the walled cells of the original lattice have not been removed. In this case, the resulting mode is an "air mode" since it traps light primarily in the air hole rather than in the silicon walls.

Figure 5C:
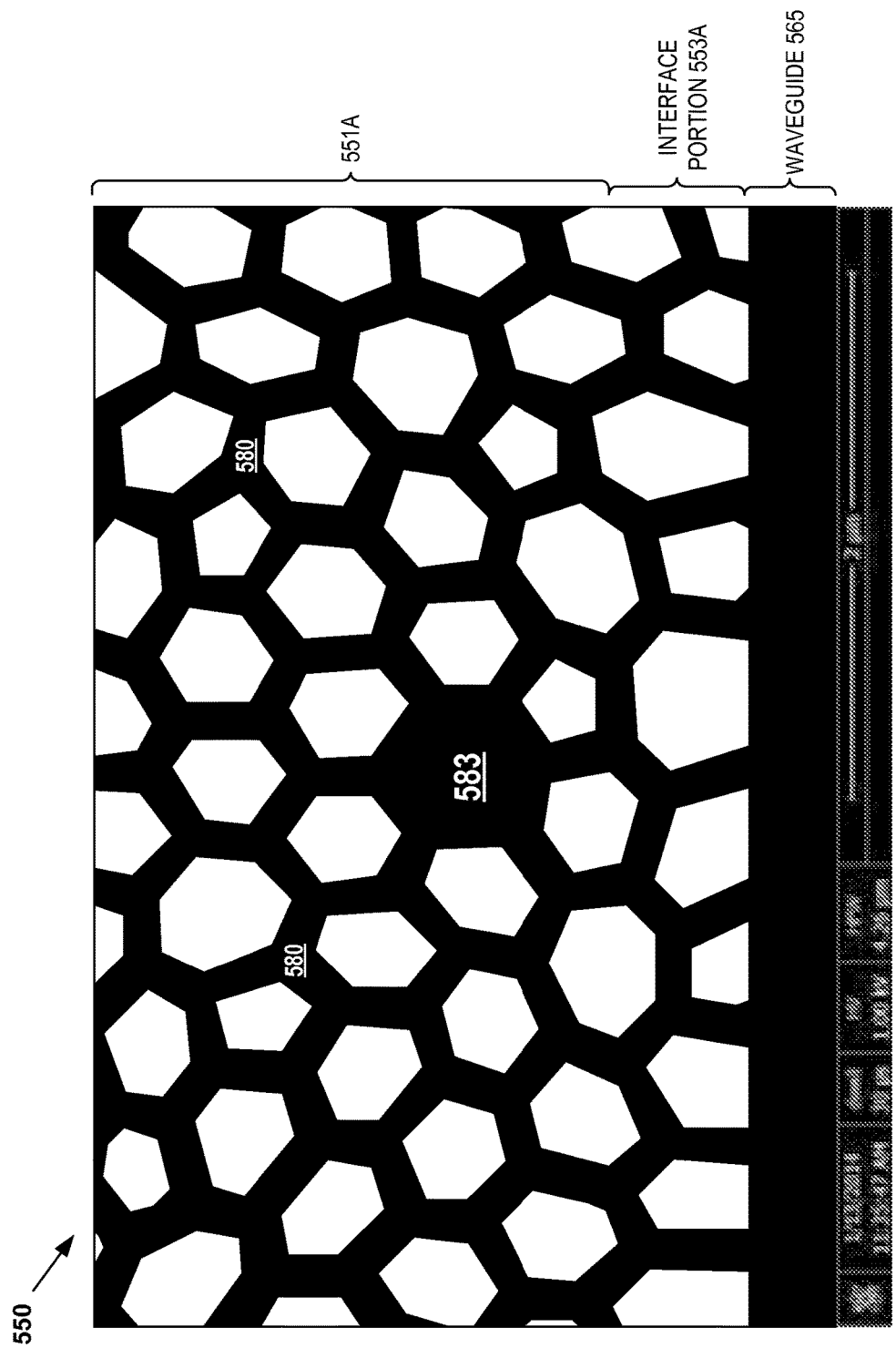
FIG. 5C illustrates an optical structure having an example resonant cavity, in accordance with an embodiment of the disclosure.

FIG. 5C illustrates an optical structure 550 having a resonant cavity 583, in accordance with an embodiment of the disclosure. Optical structure 550 is similar to optical structure 500 shown in FIG. 5B, except that the resonant cavity in optical structure 550 is made by one of the walled cells in the lattice 580 being filled. Resonant cavities may also be formed by filling or partially filling at least one void of walled cells in lattice 580. In FIG. 5C, resonant cavity 583 is formed by filling (completely) a void of a walled cell with silicon, where lattice 580 is also made of silicon. It is appreciated that in fabrication the phrase "filling a void"

may translate to refraining from creating the void in the first place, for example, when silicon is being etched to generate lattice 580 and waveguide 565. In FIG. 5C, resonant cavity 583 is two walled cells from waveguide 565. Other resonant cavities (resonant defects) besides those discussed in this disclosure can be used, including examples of HUDSian defects described in PCT/US2012/055791 (WO2013055503A1) and "Optical cavities and waveguide in hyperuniform disordered photonic solids" by Florescu, Steinhardt, and Torquato, Phys Rev B, 2013, both documents which are herein incorporated by reference.

Similarly to optical structure 200, waveguide 515/565 and lattice structure 530/580 may be formed of the same material (e.g. silicon) in a contiguous structure. Each of the walled cells that make up lattice 530/580 include walls surrounding a void. The void may be filled with air, a vacuum, or another material. And, voids in walled cells may be described as an air hole when air fills a void in a walled cell. Also similarly to optical structure 200, in one embodiment, the voids in the walled cells in optical structure 500/550 are filled with a fill material having a first index of refraction that is different than an index of refraction of the material that forms the lattice 530/580 and waveguide 515/565. The fill material and the material forming lattice 530/580 may have oppositely-signed dependence of index of refraction on temperature. In one embodiment, the fill material includes titanium-dioxide and the lattice material is silicon. An oxide or a nitride is used to fill the voids in some embodiments. The walls can be made of other semiconductors as described previously such as III-V materials and their alloys, or other Group IV materials such as Ge or Si/Ge alloys, or electrooptic materials such as LiNbO, BaTiO3, or electro-optic polymers, specially-doped plastics having engineered bulk real and imaginary dielectric constants, commercial or more recently developed plastics such as are available for use with macroscopic and nanoscopic 3d printers, and ceramic materials such as alumina.

HUDS structure portions 501A/551A and 501B/551B include walled cells that are purely "HUDSian" in that they are designed and adhere to HUDS requirements and principles. However, the walled cells in adjusted interface portions 503A/553A and 503B/553B are adjusted to facilitate a smooth boundary of waveguide 515/565 and do not necessarily strictly adhere to HUDSian design principles. In one embodiment, adjusted interfaces 503A/553A and 503B/553B transitions from a periodic or quasiperiodic pattern on the smooth boundaries of waveguide 515/565 to a hyperuniform disordered pattern at an interface between the HUD structure 501A/551A and 501B/551B and the adjusted interfaces 503A/553A and 503B/553B.

Designing optical structure 500 and 550 is similar to the design of optical structure 200, except that after the HUDS structure is designed and adjusted to form the adjusted interface portion, optical cavity 533/583 is formed. Adjusted interface portions 503A/553A and 503B/553B can be generated using the same techniques described in association with adjusted interface portions 203A and 203B. Once the design of optical structure 500 or 550 is determined, that design can be fabricated (e.g. etched in silicon).

Figure 6:
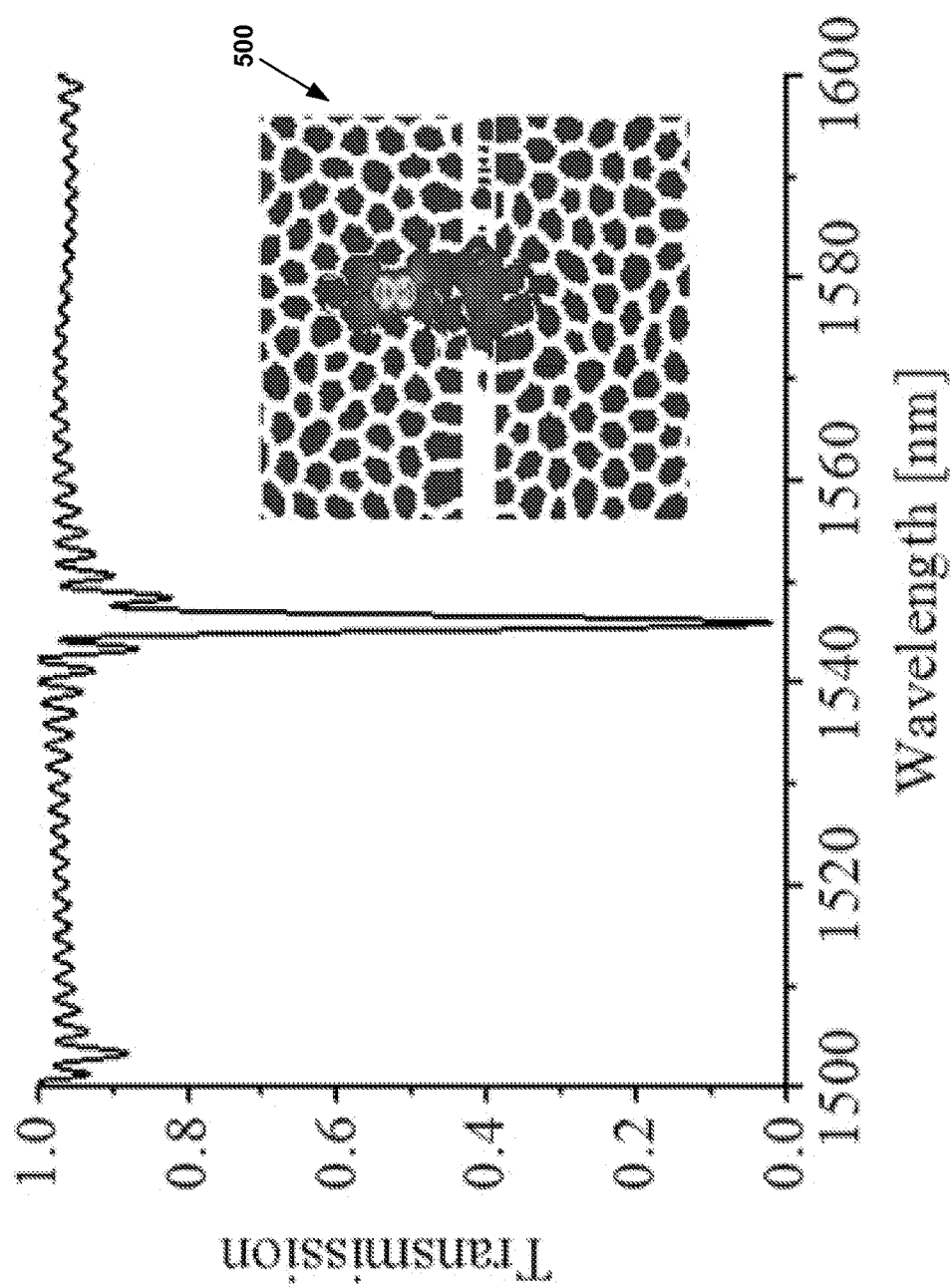
FIG. 6 illustrates a chart showing the performance of a waveguide in an example optical structure, in accordance with an embodiment of the disclosure.
Figures 7A, 7B:
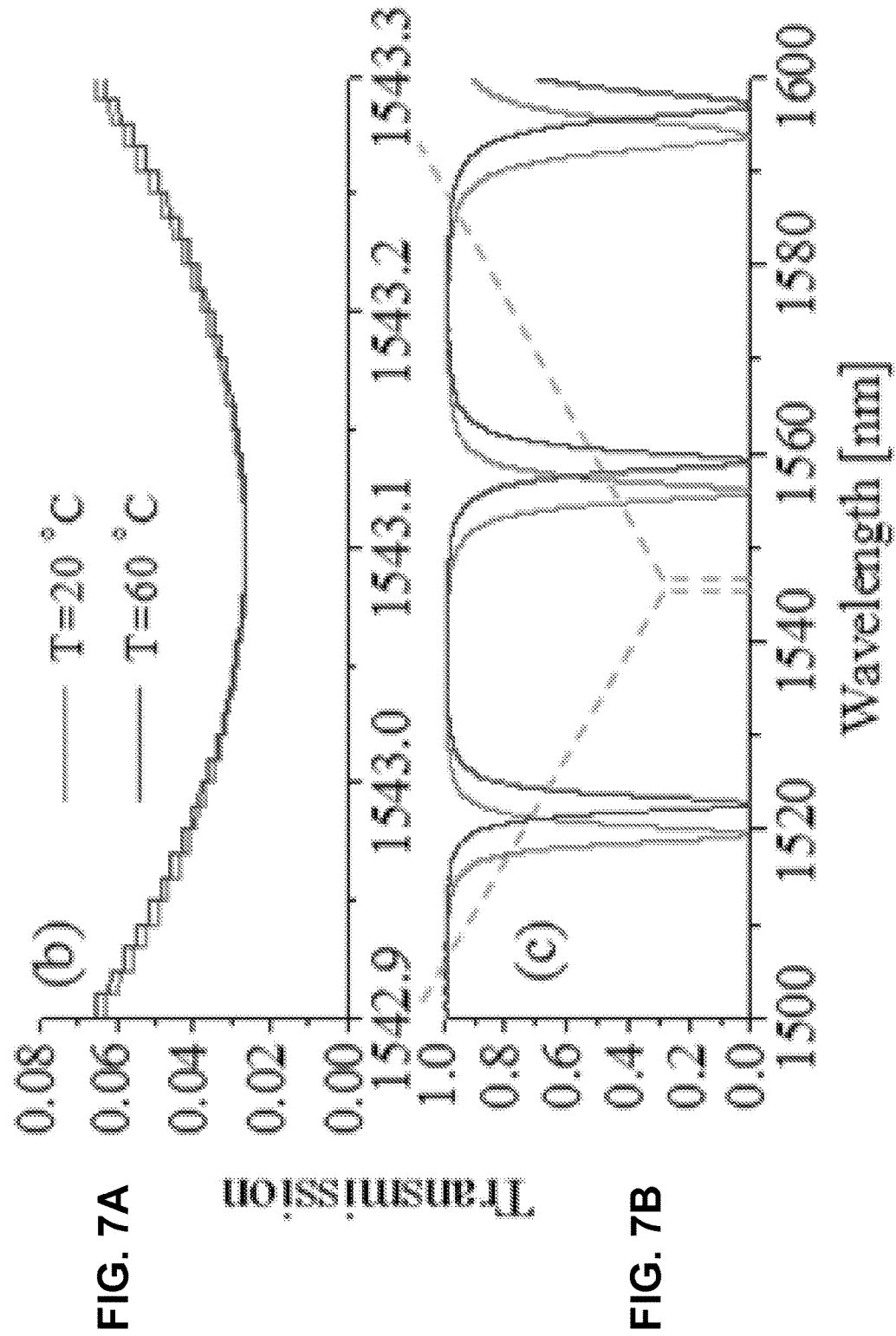
FIGS. 7A-7B illustrates the transmission of optical structures over temperature ranges, in accordance with an embodiment of the disclosure.

FIG. 6 illustrates a chart showing the simulated performance of a waveguide in example optical structure 500 using a 2.5d eigenvalue solver. FIG. 6 shows that infrared light between 1500 nm and 1600 nm propagates through waveguide 515 at very high efficiency, although a very narrow frequency band (1544 nm-1547 nm) is trapped (resonates) in resonant cavity 533. Hence, resonant cavity 533/583 and waveguides 515/565 are configured to block (a.k.a. "drop") the specified frequency band and pass the remaining bandwidth of the optical signal through waveguides 515 and 565, respectively. Therefore, FIG. 6 indicates that high performance filtering is achievable using the resonant cavities described in FIGS. 5A-5C. Furthermore, the resonant cavities described in FIGS. 5A-5C have also been shown to possess improved temperature stabilization properties when compared to conventional solutions such as micro-rings. FIG. 7A illustrates the transmission of waveguide 515 when resonant cavity 533 is tuned to filter out a frequency band centered around 1543.1 nm. As FIG. 7A illustrates, there is very little wavelength shift in the filter performance even with a 40° C. shift in temperature. One numerical simulation showed that the temperature shift would be ~0.15 pm/K°. FIG. 7B shows the wavelength shifts in conventional optical filters can be three or more nanometers over the same 40° C. range. Conventional micro-ring resonators, in comparison, have a wavelength shift of ~60-90 pm/K.

FIGS. 8A and 8B illustrate a HUDS-based electrically-controlled optical modulator 899 that can be included in a PIC, in accordance with an embodiment of the disclosure. Side view FIG. 8A shows an insulator layer 810 disposed on a handle substrate 805. Insulator layer 810 may be silicon-dioxide and the handle substrate may be silicon. HUDS structures 801A and 801B are formed by walled cells organized in a lattice and are disposed on the insulator layer. HUDS structures 801A and 801B can have the same properties as HUDS structures 201A/501A and 201B/501B with regard to the walls and voids. In FIG. 8A, adjusted interface portion 803A is disposed between HUDS structure 801A and resonant structure 833 and adjusted interface portion 803B is disposed between HUDS structure 801B and resonant structure 833. Adjusted interface portions 803A and 803B are similar to adjusted interface portions 203A and 203B, except that the lattice is adjusted to the boundary of resonant structure 833 as well as being adjusted to the boundary of waveguide 815, in the illustrated embodiment.

A first doping region is disposed within HUDS structure 801A. In the illustrated embodiment, the first doping region includes doping sub-regions 821 and 822. Doping sub-region 821 is N+ doped and doping sub-region 822 is N doped. Doping sub-region 821 is N+ doped to facilitate electrical conduction with first electrical contact 831. Doping sub-region 822 is disposed between resonant structure 833 and doping sub-region 822. In other embodiments (not illustrated), the first doping region is not separated out into sub-regions, but has a homogenous doping concentration between resonant structure 833 and first electrical contact 831. A second doping region is disposed within HUDS structure 801B and has an opposite doping polarity as the first doping region. In the illustrated embodiment, the second doping region includes doping sub-regions 823 and 824. Doping sub-region 823 is P doped and doping sub-region 824 is P+ doped. Doping sub-region 824 is P+ doped to facilitate electrical conduction with second electrical contact 832. Doping sub-region 823 is disposed between resonant structure 833 and doping sub-region 824. In other embodiments (not illustrated), the second doping region is not separated out into sub-regions, but has a homogenous doping concentration between resonant structure 833 and second electrical contact 832.

In FIG. 8A, waveguide 815 is disposed between the resonant structure 833 and is configured to guide an optical signal. In FIG. 8A, an air space void is situated between sections of insulator layer 810 and is disposed between optical structure 800 and handle substrate 805. Removing a portion of insulator layer 810 to make room for air provides symmetrical air cladding on both the top and bottom surfaces of the device. It is appreciated that handle substrate 805 may be used to facilitate CMOS fabrication techniques and that it may ultimately be thinned or removed, and that asymmetric cladding designs without removal of the underlying oxide may be preferred for some applications or for potentially improved manufacturing yields.

Figure 8C:
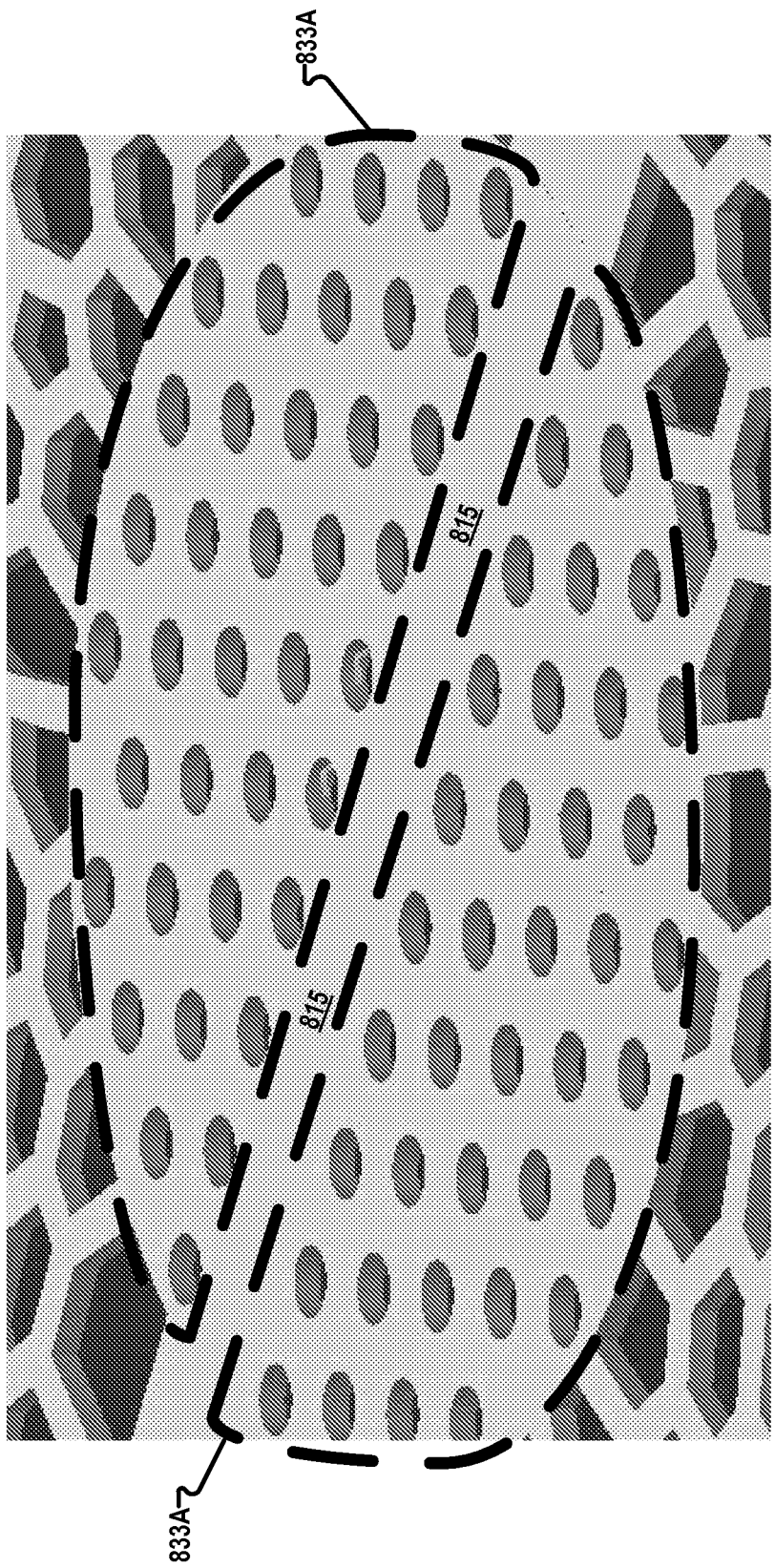
FIGS. 8C and 8D show example resonant structures that can be used as the resonant structure in FIGS. 8A and 8B, in accordance with an embodiment of the disclosure.

FIG. 8B shows a semi-transparent plan view of optical modulator 899, in accordance with an embodiment of the disclosure. The example plan view shows that resonant structure 833 includes two semi-circle shapes, one on either side of waveguide 815. FIG. 8C shows one example of a conceptual illustration of a resonant structure 833A that can be used as a resonant structure 833.

Figure 8D:
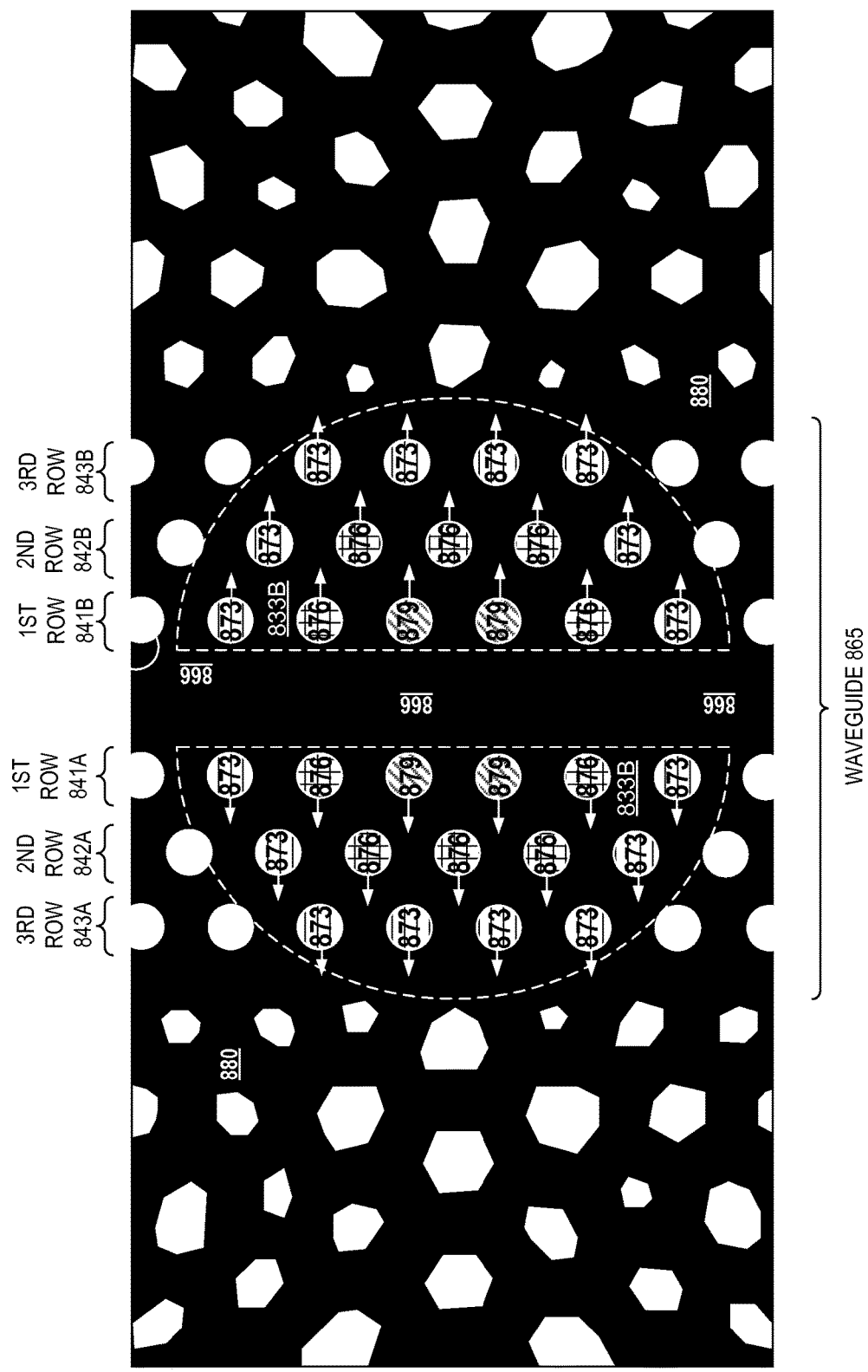

FIG. 8D shows an example resonant structure 833B that can be used as resonant structure 833, in accordance with an embodiment of the disclosure. FIG. 8D shows resonant structure 833B being a perforated structure that connects the lattice 880 and waveguide 865. In FIG. 8D, waveguide 865 is a photonic crystal waveguide having three rows of circular perforations on both sides of an unperforated central strip 866. Third row 843 of the circular perforations is farthest from central strip 866 while first row 841 is closest to central strip 866. Second row 842 of the circular perforations is disposed between third row 843 and the first row 841 of the circular perforations. In one embodiment, all the circular perforations are the same size.

In the illustrated embodiment, perforated resonant structure 833B includes an outer segment of eight circular perforations 873. Each circular perforation 873 is offset from its respective row by a first offset distance. The first offset distance is away from central strip 866, as indicated by the white arrows. In one embodiment, the first offset distance is 3 nm. Perforated resonant structure 833B also includes a middle segment of five circular perforations 876. Each circular perforation 876 is offset from its respective row by a second offset distance that is greater than the first offset distance. The second offset distance is away from central strip 866, as indicated by the white arrows. In one embodiment, the second offset distance is 6 nm. Perforated resonant structure 833B also includes a middle segment of two circular perforations 879. Each circular perforation 879 is offset from its respective row by a third offset distance that is greater than the second offset distance. The third offset distance is away from central strip 866, as indicated by the white arrows. In one embodiment, the third offset distance is 9 nm. The middle segment of circular perforations 876 is disposed between circular perforations 873 of the outer segment and the circular perforations 879 of the inner segment.

The circular perforation holes can be etched from silicon to fabricate resonant structure 833B. Having waveguide 865, lattice 880, and perforated structures 833B all be a continuous structure lends itself to a simplified CMOS fabrication as all of the features can simply be etched from silicon. Perforated resonant structure 833B is configured to be resonant at a frequency band that is a subset of a bandwidth of optical signal 896 and modulated optical signal 897 includes that frequency band while the remaining bandwidth of optical signal 896 is not transmitted in modulated optical signal 897.

In one embodiment, the lattice spacing and fill ratio of the walled cells in the lattice of HUDS structures 801A/B is 473 nm and 37%, respectively. The lattice spacing and fill ratio when adjusted interface portions 803A/B transition from the photonic crystal to the HUDS may be 420 nm and 55%, respectively.

In operation, an optical signal 896 propagating through waveguide 815 can be modulated into modulated optical signal 897 by changing an electrical modulation signal coupled to electrical contacts 831 and 832. Modulating the voltage across electrical contacts 831 and 832 changes a corresponding electrical field across resonant structure 833. At zero volts on electrical contacts 831 and 832, waveguide 815 and perforated resonant structure 833B are configured to function as a narrow pass band filter that transmits light (as an optical signal) only at the resonant frequency of the cavity. When a voltage (e.g. 2 VDC) is applied to electrical contacts 831 and 832, the index of refraction of resonant structure 833 changes, spoiling the cavity Q, and thus shifting the wavelength of the light of the optical signal. Therefore, the optical signal can be modulated in response to an electrical modulation by shifting the wavelength of the light propagating through waveguide 815. A controller (not illustrated) including logic, a microprocessor, and/or a Field-Programmable-Gate-Array may be coupled to the electrical contacts to drive the electrical modulation signal. The controller may be coupled to a plurality of electrical contacts to modulate the optical signals in a plurality of waveguides by adjusting the index of refraction of a resonant structure. It is appreciated that since different voltages applied to electrical contacts 831 and 832 generate different index of refraction changes in resonant structure 833, different voltages correspond to different wavelength shifts. Thus, using different analog voltages in an electrical modulation signal can result in multiple different (distinct) wavelength outputs of the optical signal allowing grey-scale control of the outputted optical signal.

Figure 8E:
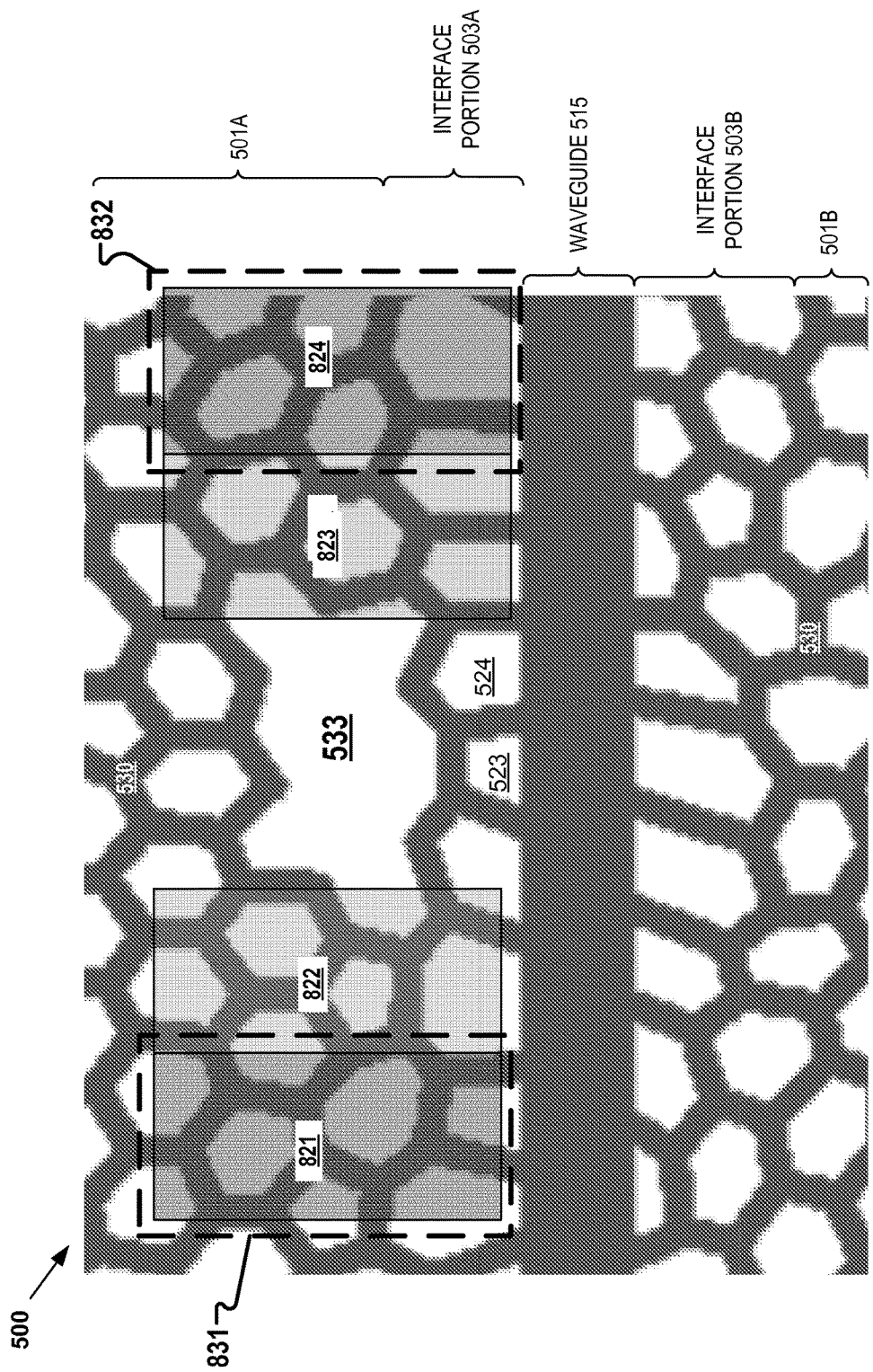
FIGS. 8E-8F show plan views of example resonant cavities having first and second doping regions disposed in a semiconductor lattice to change the electrical field to modulate an optical signal propagating through a waveguide, in accordance with an embodiment of the disclosure.

Although waveguide 815 is illustrated being between resonant structure 833 in FIGS. 8A and 8B, electrical contacts (and associate doping regions) can also be used in conjunction with other resonant structures to modulate optical signals propagating through a waveguide. For example, resonant cavity 533 or 583 could also be used as a resonant structure. FIG. 8E shows a plan view of resonant cavity 533 having first and second doping regions disposed in the semiconductor lattice to change the electrical field (and thus index of refraction) of resonant cavity 533 to modulate an optical signal propagating through waveguide 515, in accordance with an embodiment of the disclosure. Electrical contacts 831 and 832 are conductively coupled to the doping regions to provide the modulation signal. In this embodiment, resonant cavity 533 and waveguide 515 are configured to block the frequency band that resonant cavity 533 is tuned to and pass the remaining bandwidth of the optical signal propagating through waveguide 515. In the embodiment illustrated in FIG. 8E, waveguide 515 does not divide the resonant structure, as in FIG. 8A-8D. In other words, the resonant cavity in FIG. 8E is "adjacently coupled, whereas the resonant cavity in FIG. 8D is "in-line coupled."

Figure 8F:
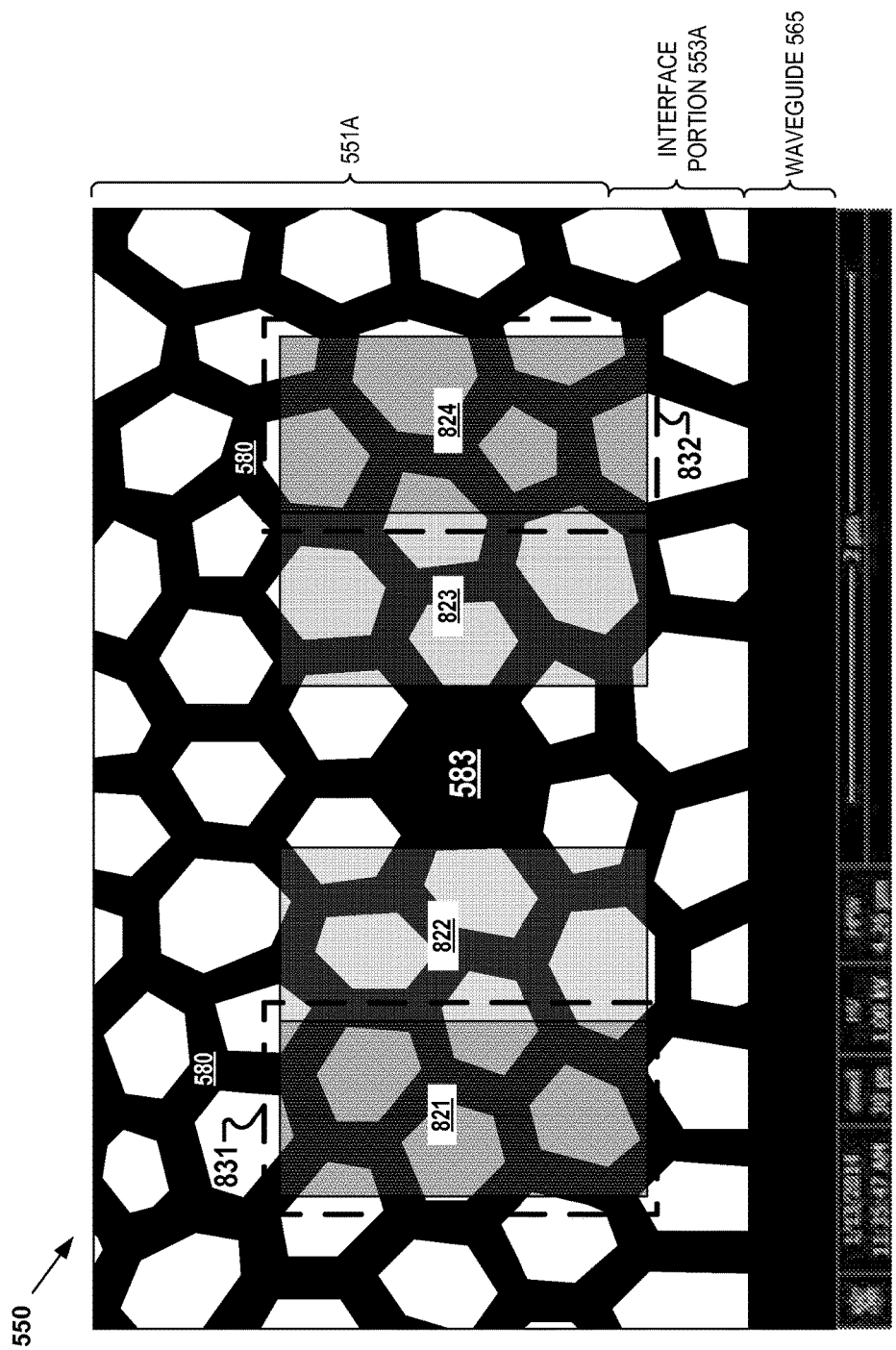

FIG. 8F shows a plan view of resonant cavity 583 having first and second doping regions disposed in the semiconductor lattice to change the electrical field (and thus index of refraction) of resonant cavity 583 to modulate an optical signal propagating through waveguide 565, in accordance with an embodiment of the disclosure. Electrical contacts 831 and 832 are conductively coupled to the doping regions to provide the modulation signal. In this embodiment, resonant cavity 583 and waveguide 565 are configured to block the frequency band that resonant 583 cavity is tuned to and pass the remaining bandwidth of the optical signal propagating through waveguide 565.

Figure 9:
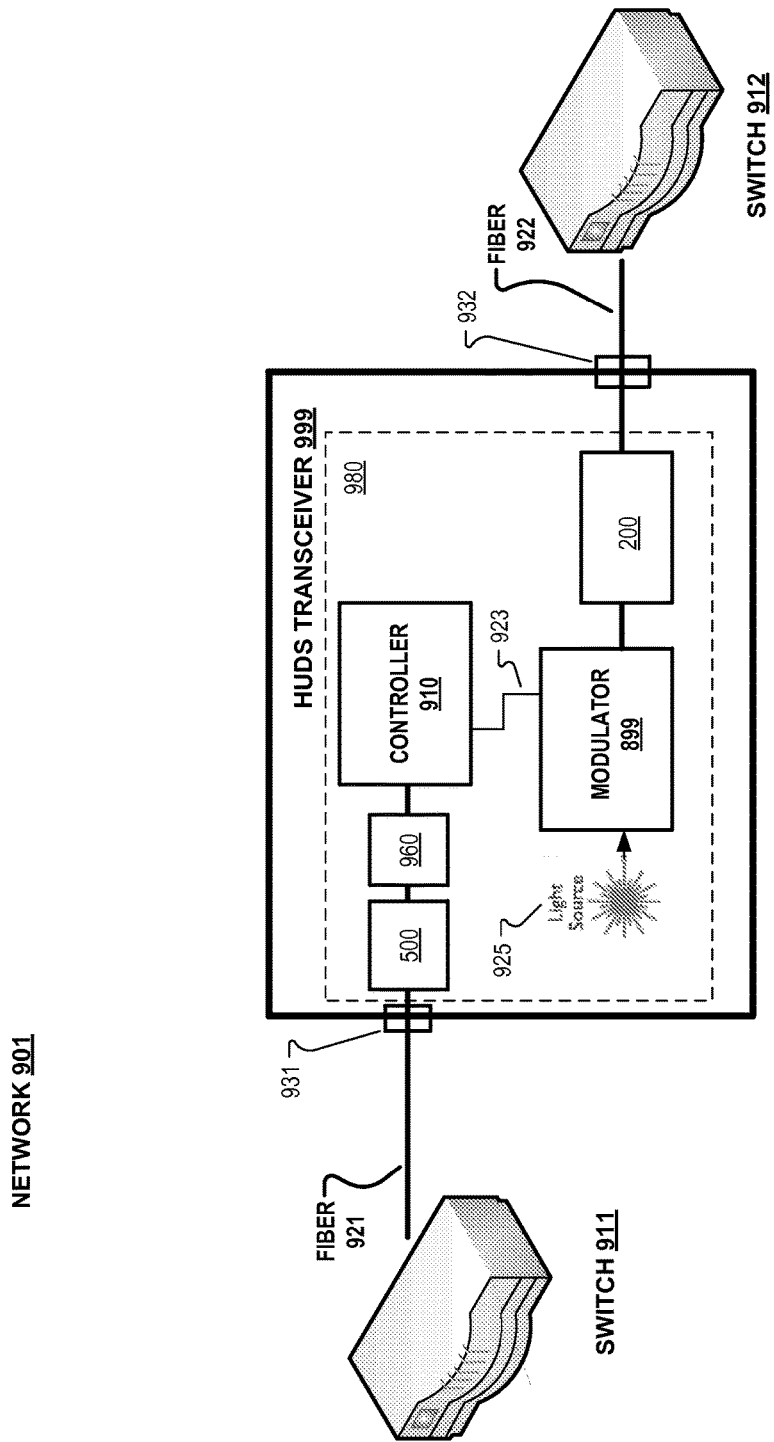
FIG. 9 illustrates a block diagram of an example optical transceiver 999 that includes a HUDS PIC 980, in accordance with an embodiment of the disclosure.

FIG. 9 illustrates a block diagram of an example optical transceiver 999 that includes a HUDS PIC 980, in accordance with an embodiment of the disclosure. Optical transceiver 999 is coupled between optical switch router 911 and optical switch router 912. An electrical input port 931 of optical transceiver 999 is coupled to receive an incoming optical signal from optical switch router 911 via optical fiber 921. An output port 932 of optical transceiver 999 is coupled to transmit an outgoing optical signal from optical transceiver 999 to optical switch router 912 via optical fiber 922. PIC 980 includes optical structure 500, optical receiver 960, controller 910, optical modulator 899, optical structure 200, and light source 925. FIG. 9 shows one example of how the disclosed optical structures can be used within a network, although many more examples (unillustrated) are possible. The compactness of the resonant structures compared to alternatives such as conventional microring resonators means advantageously allows for substantially denser multiplexing of multiple wavelengths on a single chip, as might be required, for example, to fabricate a 100 Gb/s or 1 Tb/s modulator on a chip by integrating together on a single chip the PIC elements required to control 10s or 100s of wavelengths each operating at 10 Gb/s.

In FIG. 9, optical structure 500 receives the incoming optical signal via input port 931. Optical structure 500 filters the incoming optical signal according to the tuning of resonant cavity 533. Hence, only a small frequency band of the optical signal will ultimately propagate through waveguide 515 and be received by optical detector 960. It is appreciated that many optical structures 500 that are tuned to different frequency bands can be coupled to input port 931 to function as an optical splitter, each filter sending a different frequency band to a different optical detector. The resonant structures can be configured with their coupling waveguides to either pass or drop signals of particular wavelengths. A plurality of optical structures 500 (tuned to different frequency bands) can also be cascaded together to achieve different filtering characteristics. Alternatively, multiple wavelengths incoming from switch 911 can be edge-coupled to optical structure 500, split-up on chip in a parallel fashion, fed separately to an array of photoreceivers 960, after which the controller 910 can drive an array of optical modulators 899 each tuned to a different wavelength, then multiplexed together in 200 into a single waveguide, out-coupled to a fiber with a broadband edge coupler coupled to output port 932.

Controller 910 generates modulation signal 923 in response to receiving the filtered optical signal from optical structure 500 via optical detector 960, which may be a photodiode. Modulation signal 923 is driven by controller 910 to modulate a voltage across the electrical contacts 831 and 832 of optical modulator 899. Optical modulator 899 is coupled to receive transmission light from light source 925 (e.g. laser or LED) in waveguide 815 and modulate the transmission light by changing the electric field around resonant structure 533/583. The modulated transmission light may then be guided by waveguide 215 in optical structure 200 to output port 932 and be transmitted to switch 912 via optical fiber 922. Of course the illustrated embodiment of FIG. 9 is exemplary and is only one example of how the disclosed optical structures can guide, filter, and modulate light for network purposes.

The utility of the temperature-stabilized PBG and HUDS-based resonant optical cavities and associated photonic integrated circuits making up the optical interconnects through which data is transmitted in HUDS-enabled networking and/or sensing systems can be better-understood according to the value which HUDS-enabled interconnects formed by the inventive HUDS components provide to the network as a whole. While Metcalf's Law asserts that the value of a network scales as the square of the number of nodes that are interconnected, Odlyzko has argued that the value is actually n log(n). Both these estimations overlook the fact that the value of the network also depends sensitively on the rate of communications between the nodes. One way to include inter-node bit rates in the analysis of the value of a network of n nodes is to consider a frozen instant in time during which the number n of nodes communicating will depend sensitively on the data rate at which nodes are able to communicate. As an extreme example, consider a network in which nodes communicate synchronously, only once per second. Assessing the value of such a network at the half-second mark would result in a valuation of zero, as there would be no communication whatsoever between the network elements at this moment of time. Legacy networks interconnected for example at 1 Gb/s, would have had vanishingly small instantaneous value for time slices as short as femtoseconds, as the number of nodes n communicating during these very closely-space time slices would be vanishingly small. It is therefore clear that the number of nodes n in a network varies as a function of time and that the relevant quantity in assessing the value of the network as a whole is not simply the number of nodes in the network, but the product of the number of nodes with the interconnection bit rate R attributed to those nodes. Adapting Metcalf's Law to incorporate the added-value of the interconnect bit rate leads to the value of the network scaling not simply as $n^2$ but as $(nR)^2$.

To the above description of the value to a network of an increase in the interconnect bit rate, it is important to add an understanding of how networks create revenue, and how the bit rates, energy efficiency, initial capital cost and other relevant interconnect specifications contribute to the revenue-generating capability of the network. The number of business models for using the internet to generate revenue has flourished. Several exemplary optical networking systems on which these kinds of businesses operate will be examined by way of example, particularly in light of the impact of the reduced energy requirements and potentially improved temperature stability of the comprising components impacts the utility of the business.

First, consider the down-loading of movies from companies such as Netflix. To the extent that the movies can be downloaded faster than the user can watch them may mean that the value to a consumer of a movie being purchased may scale less than linearly with the speed of an end-user's interconnect. That is, just because the end-user can download two movies in 10 minutes rather than just one movie in 10 minutes doesn't necessarily mean that the end user will either download two movies rather than one, or that he is willing to pay twice as much for a single movie as he would pay were his internet connection half as fast. While a faster interconnect rate certainly improves the end-user's consumer experience, the value which he attributes to the bit rate of his interconnection may scale sub-linearly with the bit rate of his interconnection. Depending on whether the user's electrical power is provided by a wall plug as is common today rather than a battery or solar panel as may be more common in the future, the user may not be particularly sensitive to the energy requirements of the download. The situation at the nearest content delivery network center, by contrast, is substantially more sensitive to the performance features and energy budget of the interconnect and its temperature stabilization circuitry, in that the content deliver network needs to build and power sufficiently high bit rate capacity to multiplex as many video downloads as their customers may demand during anticipated peak hours of operation.

A second example would be in the case of a networking system designed to support teleconferencing. In this case, the video signals need to be streamed in real-time rather than asynchronously downloaded. Network congestion anywhere in the network can in this case result in complete breakdown of the teleconference experience. In this case, network interconnections capable of providing twice the bit rate at less than twice the power are substantially more likely to be able to support twice the traffic, particularly at peak loads. In this case, the utility to the teleconference service provider of the interconnects' bit rate may, in a practical sense, scale with the amount of revenue-generating traffic which it can support. Energy savings associated with reduced temperature control requirements can be particularly enabling in scenarios where energy is expensive and/or unreliable or intermittent.

Third, consider the utility of increased bit rate to a network system designed to implement electronic trading. In this case, while energy per bit costs may pale in comparison to the value of a single trade, having a faster interconnection rate is known to lead directly to the capture of trading revenues. Reduced temperature stabilization circuitry can in this case lead to denser interconnects, more closely-spaced servers, and reduced latency. To the extent that the fastest interconnect wins, the entire value of a company's trades may indeed be directly attributed to factors such as data rate and latency.

A fourth case for consideration may be the utility of the subject invention in network systems designed to generate revenue via advertising on the internet. Such revenue-generating systems are particularly relevant to search engines and social networks operating out of increasingly energy-hungry data centers. To-date, these networking systems and the businesses which they've enabled have relied on the fact that computer processors are cheap, interconnects are cheaper, and interconnect energy costs are negligible. As traffic grows, datacenters have expanded by adding additional processors. Interconnection capital costs between the processors, initially small relative to the costs of the processors, are now becoming more comparable to the costs of the processors. As well, the energy costs associated with interconnects, initially small relative to the amount of energy required to run the processors, are now becoming significant. What this means is that energy constraints on data centers contribute toward limiting how high an interconnect data rates is deployable in a practical sense. Increasingly, energy costs therefore conspire together with capital costs to determine the useful computational output (a.k.a. "good put") of a data center. Packet-routing systems such as those used in data centers were brilliantly-designed to respond robustly to congestion; packets dropped in the presence of congestion are re-sent. But while the resending of dropped packets beneficially assures that the data eventually arrives at the destination for which it was intended, the need to re-send the packets inarguably reduces the "goodput" of the equipment sending the data, the equipment receiving the data, and the data center as a whole. In datacenter business models, the value of improved interconnect bit rate can be related directly to the goodput of the datacenter in terms of the return-on investment (ROI) which the advertising business model and/or social networking business model makes on the core data center operation which executes the company's computational methods.

As a fifth example, consider networking systems designed to support retail sales. Large online retailers find that users searching for items have limited patience in waiting for a search algorithm to complete. For this reason, these retailers have been motivated to size their data center operations for their busiest season. Search algorithms involve lots of communication within and between datacenters. The utility of the networking systems designed to support retail sales depends in a practical sense quite sensitively on the profits earned by online retailers, after payment of both the capital (including interconnect, computing, and cooling hardware, costs of which depend on the performance specifications of the interconnect) and operational costs of the data centers (which includes an increasingly large component due to the energy requirements of the data interconnects). Financial profits and associated viability of online retail businesses are hence directly linked to performance characteristics of the interconnects over which their servers communicate, such as data rate, energy efficiency including energy required to achieve necessary temperature stabilization, and bandwidth density per unit chip area.

As a sixth example, consider networking systems designed to broadly support cloud computing systems. Such systems increasingly deploy dynamically-programmable network resources designed to flexibly adapt their computing and communications resources so as to dynamically-adapt the efficiency or "goodput" of their systems depending on which one or more of the above-described systems might be in demand by their customers. Dynamic reconfiguration of network resources for dynamically-controllable cloud computing network systems requires increasingly dense integration of network transceivers with software-controlled electronics control and monitoring systems. Reducing the temperature stabilization required of interconnects enables the interconnects to be arranged in a substantially more compact manner. The compactness, energy efficiency, high bandwidth, and prospects for high-density chip-scale implementation of complex control and monitoring functions on the inventive HUDS PICs enable substantially higher-performance cloud computing networking systems than would otherwise be possible.

The six optical networking systems enabled by the inventively temperature-stabilized PBG resonant optical cavities, and described above, are not meant to be limiting, but were chosen to illustrate the substantial utility of increased interconnect bit rates and how the value of interconnect bit rates scales vertically through key networking systems, the currently high utility of which will be substantially increased by inventively designing these networks to comprise the inventively temperature-stabilized resonant optical cavities. The utility of interconnects in networking applications is substantially greater than just the transmittal of data from one point to another.

Interconnects are a key enabling component in networks. Particularly as optical interconnects move closer and closer to the computer processors, and indeed into the computer processor chips themselves, the utility of interconnects increasingly depends on the extent to which they can be manufactured via the same massively-parallel manufacturing techniques which have been used to advantage in making the costs of computer processors drop as a function of time in accordance with Moore's Law. One way to do this is to develop new approaches for the design of high performance photonic integrated circuits having the largest possible bandwidth density and/or component density per unit chip area while at the same time enabling the design and fabrication of increasingly complex, energy-efficient, high bit-rate photonic integrated circuits.

One method or approach for implementing adjustments along arbitrarily-curved boundaries as are likely to surround a complex photonic integrated circuit is described in "Arbitrary waveguides in near-hyperuniform photonic slabs: Towards a general purpose modular design platform for integrated photonic circuits," by Amoah and Florescu. This paper describes a novel bottom-up design strategy for planar non-straight optical waveguides. Unlike traditional methods where a template is generated first and waveguides are designed accordingly, the waveguide is defined first and an optimized structure is then built around it. Notably, traditional triangular photonic crystal (PhC) designs can naturally be accommodated by this strategy, which is a promising candidate towards a unified design platform for complex optical microcircuits, applicable to CMOS technology. Using finite difference time domain (FDTD) computer simulations the transmission properties of bend waveguides in planar photonic slabs was evaluated and significant transmission can be achieved in the low-loss spectral range. Transmission losses as low as 13% of the maximal straight waveguide transmission were observed in the vicinity of 1.6 micron wavelength for TE radiation in a 220 nm thick suspended membrane with refractive index n=3.475 corresponding to silicon.

The field of photonics has progressed remarkably through the development of subwavelength nano-structuring technologies. This is now leading to increasing on chip integration of photonic devices. Devices such as ultralow-threshold electrically pumped quantum-dot PhC nano-cavity lasers such as described in "Ultralow-threshold electrically pumped quantum-dot photonic-crystal nanocavity laser," by Ellis et al., 2011; and fast low power electro-optic PhC nano-cavity modulators demonstrate a high level of synergy between photonics and electronics. While integrated optical circuits are being intensively researched, design freedom remains limited. Current designs are either very simplistic (strip waveguides or PhCs based on simple periodic templates, or are counter-intuitive to the human designer and computationally expensive to generate. It was recently demonstrated that large band gaps are not only achievable for periodic systems but also for disordered cases, as long as the disorder is appropriately restricted, i.e. hyperuniform. It has also recently been demonstrated that high quality factor defect cavities can be achieved in planar slab architectures putting to rest any presumption that disorder necessitates infeasible out-of-plane scattering. (Amoah and Florescu, submitted to Phys Rev Lett). The PBGs in these disordered materials are comparable in width to those found in PhCs but are also statistically isotropic. This is highly relevant for a series of novel photonic functionalities including arbitrary angle emission/absorption such as described in "Photon management in two-dimensional disordered media," by Vynck et al., Nature Materials, 2012; and free-form waveguiding "Novel Optical Cavity Modes and Waveguide Geometries in Hyperuniform Disordered Photonic Solids" by Florescu, Steinhardt, and Torquato in Phys. Rev. B, 2012; and by Man et al. in "Isotropic band gaps and freeform waveguides observed in hyperuniform disordered photonic solids," Proc. Natl. Acad. Sciences, 2013. Waveguides in PhCs are intrinsically not flexible, as the angles between waveguides depend on the lattice type. A conventional waveguide can be considered as a series of connected defect cavities along a path of scattering centers. In a hyperuniform disordered point pattern such a path would naturally be non-straight. However, even in this case the waveguide is restricted by the pre-defined template.

Instead of defining a PBG structure first and then designing waveguides accordingly we define the path of the waveguide first and then built the structure around it according to a protocol. This is a bottom-up strategy. Essentially the question is asked: "If a free-form line in a plane is drawn, what would be a good arrangement of dielectric that is most like a photonic crystal?" For planar slab architectures, for which significant care about vertical losses has to be taken as compared to 2D-only considerations, a connected trivalent network is advantageous to both the in-plane and vertical confinement of TE radiation. Such a disordered analogue to a photonic crystal can be created by applying a Voronoi method to a distribution of points. Uniformity in the point distribution is crucial in order to minimize accidentally-localized modes which are promoted into the photonic band gap topologically. Thus, if the right configuration of points around a waveguide is found, a smooth path can be made for the radiation to follow.

Figure 10:
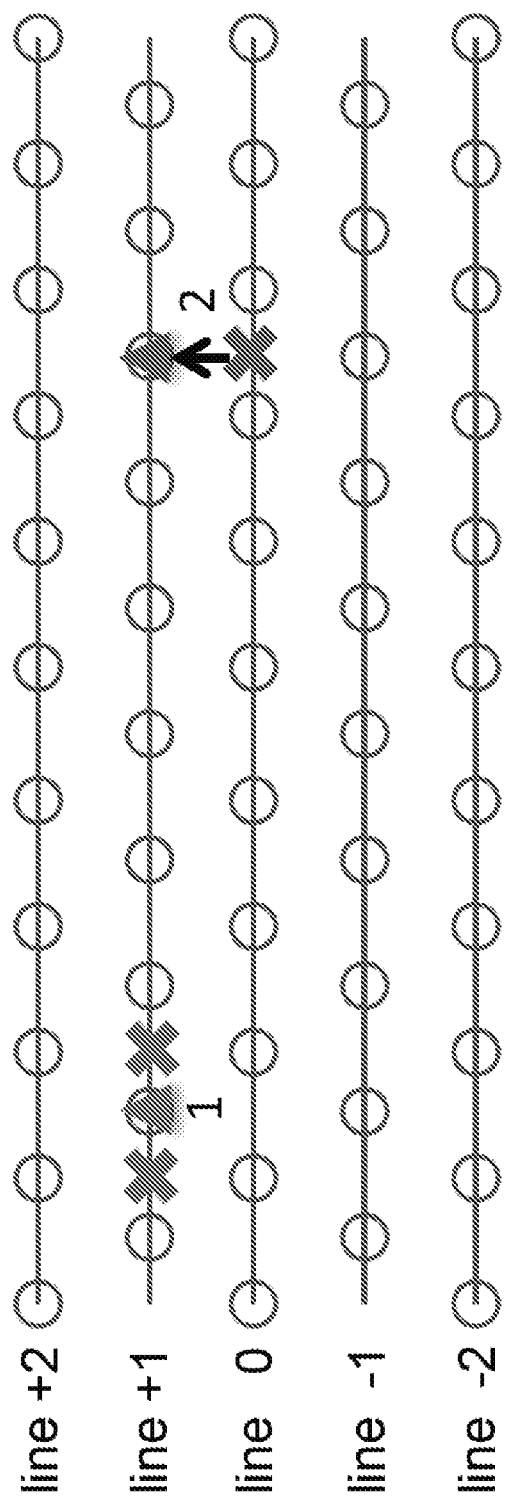
FIG. 10 illustrates a schematic of ordering Approaches #1 and #2. Approach #1 indicated by the two "X" marks and triangle labelled "1", in accordance with an embodiment of the disclosure.

FIG. 10 illustrates a schematic of ordering Approaches #1 and #2. Approach #1 indicated by the two "X" marks and triangle labelled "1." We find equally-spaced points on even lines, while on odd lines (e.g. line+1), we find points at half the period while only keep every second point (triangle labelled 1, colored red in associated publication). In Approach #2 (labelled 2 in the Figure and shown in green in associated publication), we find equally-spaced points on line 0. We then find the center points in-between and translate them to the closest position on the next line (triangle labelled 2, shown in green in the associated publication). Approach #3 is a fusion of Approaches #1 and #2 where on even lines we find the points by equal spacing and on odd lines by staggering.

Figure 11:
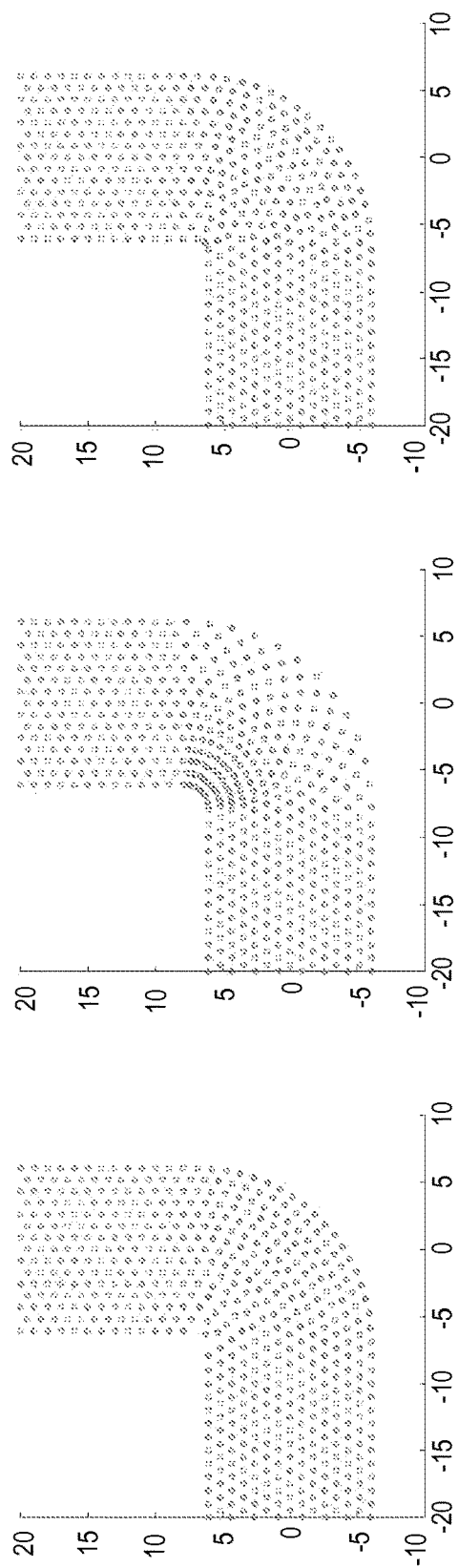
FIG. 11 illustrates a point distribution of the fixed points for a bend in which the points are arranged according to Approach #1, #2, and #3, respectively, in accordance with an embodiment of the disclosure.

FIG. 11 illustrates a point distribution of the fixed points for a bend in which the points are arranged according to Approach #1, #2, and #3, respectively. Two regular triangular-lattice periodic crystalline sections (with straight boundaries as shown in grey in FIG. 11 and shown as green and red in associated journal article) are connected by bent sections (shown in black in FIG. 11 and as blue in associated journal article) where the points are arranged according to Approach #1, #2, and #3, respectively. FIG. 11 thus shows how to distribute the points. This figure shows points distributed as a subsection of a triangular crystal and the parallel lines that are crystal planes parallel to the M high symmetry direction. One may consider the trivial statement that a straight line is essentially a circular curve at infinite radius. Then the crystal planes are just the off-set curves to this infinite circle. This suggests that the scattering centers around our bend waveguide should be arranged on the off-set curves. This is similar to yet different from the curvilinear lattice approach described by Zarbakhsh et al.'s "Arbitrary angle waveguiding applications of two-dimensional curvilinear-lattice photonic crystals," Appl. Phys. Lett., 2004. We have considered two methods by which the triangular lattice can be created by arranging points on the off-set curves, and a third which is a compromise between the first two.

Approach #1: If we consider line 0, we can consider the points to be equally spaced on the line with pitch 1. We can consider line+1 to be line 0 translated by $(\sqrt{3})/2$ upward and shifted right (or left) by 0.5. In the case of a straight line, this is also equal to saying that we found 2N+1 equally spaced points on line+1, and only kept every second point.

Approach #2: Alternatively we can consider that the lattice was built by staggering the points, i.e. we found the mid-point between points on line 0 and found the infinitesimal point on line+1 that is closest to the mid-point. Then for line+2, we find the closest position to the mid-points of line+1, etc.

The strength of Approach #1 is that the points will be distributed rather uniformly in terms of local density; however there is a considerable issue with this method. Around the bends, the point pattern has a tendency to transition from an arrangement similar to the triangular lattice to an arrangement more resembling the square lattice, which is seen in the first example of FIG. 11, FIG. 11A. A characteristic loss of staggering of the points is observed for much of the curvature. We found this to result in significant topological localization of the electromagnetic radiation, which is expected from lattice mismatching. For Approach #2 illustrated in FIG. 11B, the problem is that the distribution becomes too sparse on the convex side of a bend and too dense on the concave side, leading to local band gap mismatch.

Approach #3: In our final method, we find a compromise between Approach #1 and Approach #2. On even lines we find equally spaced point according to Approach #1 and on the next odd line we determine the points by staggering according to Approach #2.

Hyperuniformity is only well-defined for a statistically isotropic point distribution. The integration of a fixed set of points thus breaks the traditional definition of hyperuniformity. Certain solutions to the tight-packing problem and certain repulsive potential optimization methods also produce hyperuniform distributions, as described in "Local density fluctuations, hyperuniformity, and order metrics" by Torquato and Stillinger, Phys Rev E, 2003, and by "Classical disordered ground states: Super-ideal gases and stealth and equi-luminous materials," by Batten, Stillinger, and Torquato, Torquato in Journal of Applied Physics (2008). By applying a repulsive potential between N points in a square $(\sqrt{N}) \times (\sqrt{N})$ box with periodic boundary conditions, we obtain a uniform distribution similar to a $\chi=0.5$ stealthy hyperuniform one. We term this near-hyperuniform. Such a simple direct space correlation method makes it easy to define the points around the waveguide as fixed, i.e. not affected by the sorting algorithm. This capability of embedding a set of ordered designs into a disordered background optical insulator is very useful. Complex optical circuits, with multiple waveguides and devices of different symmetries can be created in the same continuous dielectric system, thus reducing input and output coupling issues between components.

Figure 12:
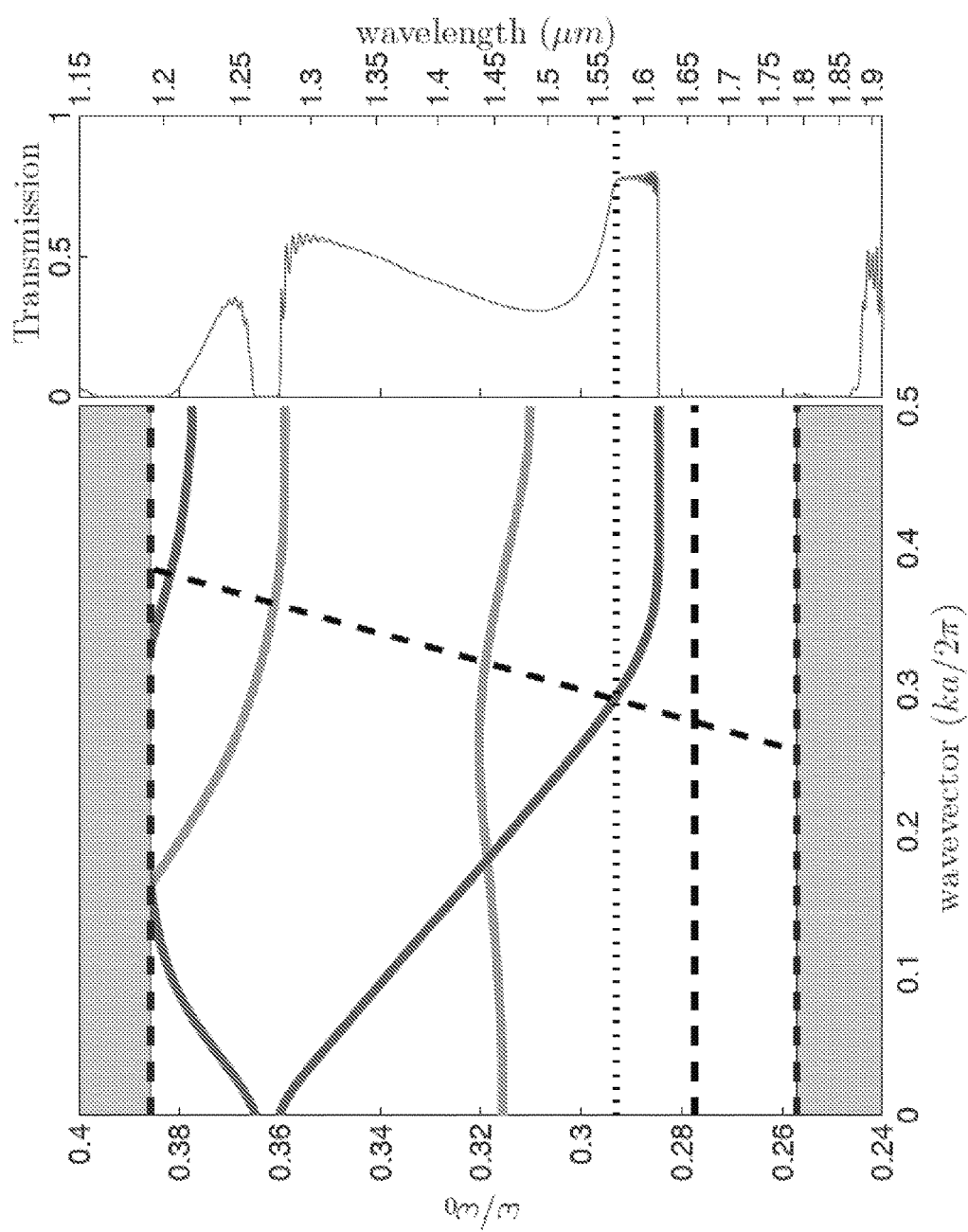
FIG. 12 shows the waveguide modes of a triangular photonic crystal of hexagons, i.e. a honeycomb structure, in accordance with an embodiment of the disclosure.

FIG. 12 shows the waveguide modes of a triangular photonic crystal of hexagons, i.e. a honeycomb structure. The even waveguide modes are shown in black (which appears red in the associated journal publication) and the odd modes in grey (which appears green in the associated journal publication). For the straight reference waveguide we chose symmetry conditions such that only even waveguide modes are excited and contribute to transmission. Low-loss waveguiding relates to the concept of guided modes. For a suspended dielectric slab in a homogeneous ambient dielectric there are guided modes, modes below the light line (which is the dispersion of the ambient homogeneous dielectric, here air) which cannot couple to the unguided radiating modes above the light line. In photonic slabs, while there exists no true band gap, the existence of "pseudo-band-gaps" enables low-loss waveguiding and high Q cavities, as described in "High-Q photonic nanocavity in a two-dimensional photonic crystal" by Akahane et al., Nature, 2003. We call the area of low loss as marked in FIG. 13 the low-loss transmission window.

FIG. 12: Dispersion relation of the waveguide modes of a triangular lattice of hexagons (honeycomb) W1 waveguide is shown on the left side of the FIG. 12. The corresponding transmission spectrum is shown on the right of the figure. Horizontal dashed lines outline stop bands and diagonal dashed line is the light line.

Figure 13:
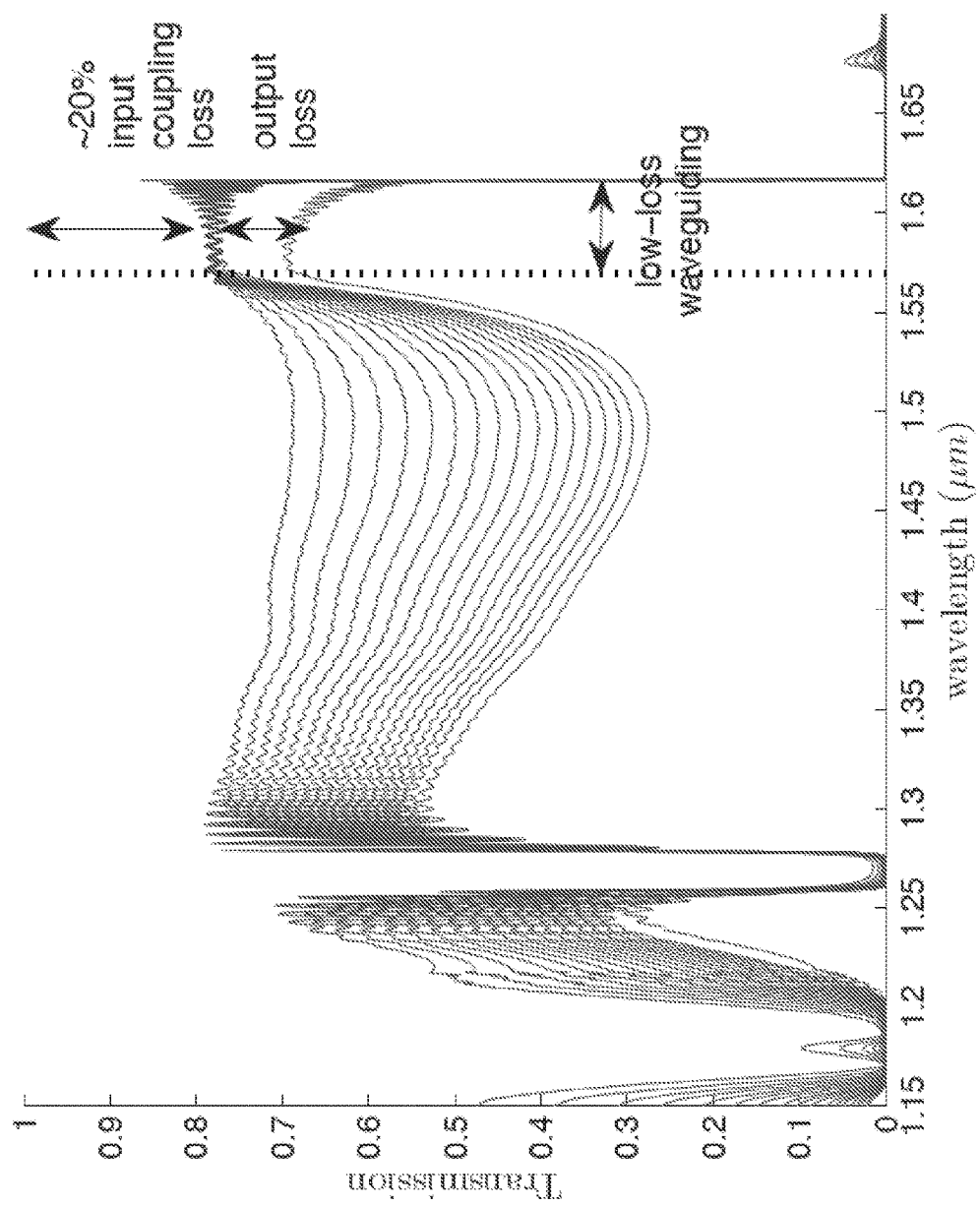
FIG. 13 illustrates transmission at successive virtual monitors along a long (80a) regular honeycomb waveguide, in accordance with an embodiment of the disclosure.

FIG. 13: Transmission at successive virtual monitors along a long (80a) regular honeycomb waveguide. Low-loss waveguiding is observed for the index-guided region.

Figure 14:
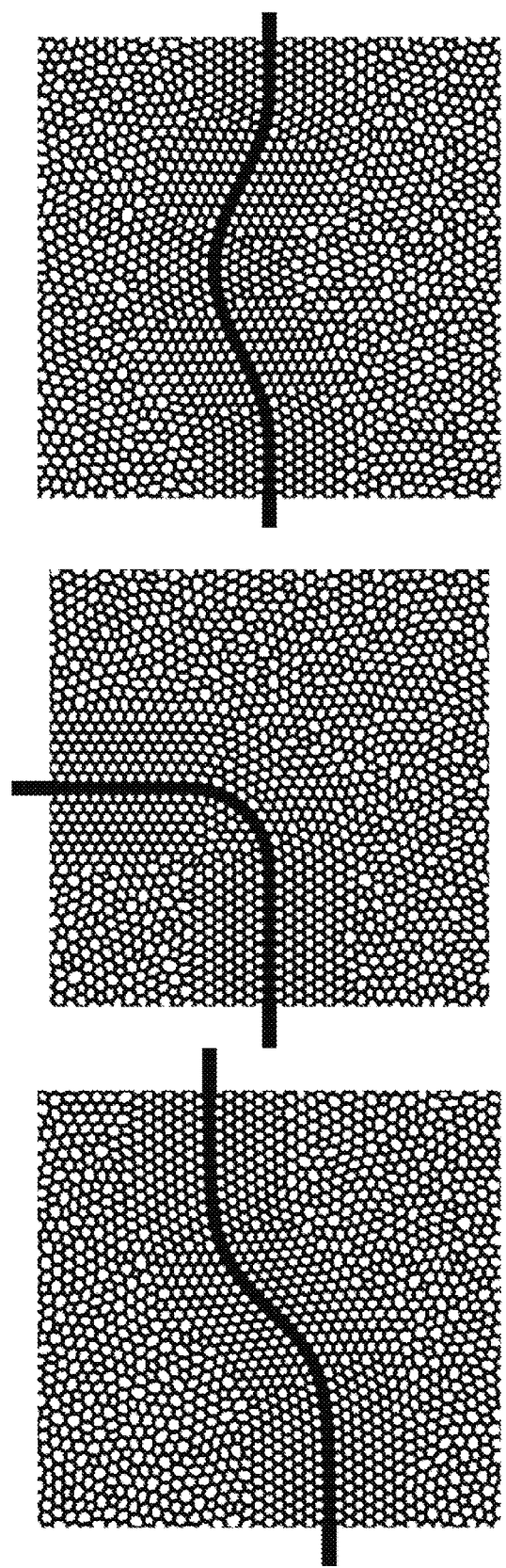
FIG. 14 illustrates the disordered honeycomb structures with embedded waveguides, in accordance with an embodiment of the disclosure.

FIG. 14 illustrates the disordered honeycomb structures with embedded waveguides. FIG. 14: Plan-view cross section of waveguides curved according the equations specified for Designs A, B, and C in the xy-plane. In each case, the design structures are each composed of two regular, periodic photonic crystal sections and a bent crystal section connecting the two periodic photonic crystal sections. The bent crystal sections are based on the curves defined by the associated equations for Designs A, B, and C, respectively, and the adjacent layers are constructed on the off-set curves using Approach #3. The waveguide and adjacent layers are embedded in a near hyperuniform background-insulating network.

Design A features a waveguide following the curve, $x \in \{-15 < x < 15\}$, $y=3$ ($\sqrt{3}$)tan h (x/5).

Design B features a waveguide that follows a 90 degree bend along a circular curve given by $\theta \in \{0, \pi/2\}$, $r=4(\sqrt{3})$, $x=r \sin \theta - r$, and $y=r \sin \theta + r$.

Design C features a waveguide that follows the following curve: $x \in \{-15 < x < 15\}$, $y=(15/\pi)(\cos(\pi x/15)+1)/2$.

A commercial-grade simulator based on the finite-difference time-domain method was used to perform the calculations. A domain of 40a×40a is defined. The total number of points is set to $N_{total}=1600$ in order to obtain unit density. For all designs we chose the unit length a to be 460 nm. In each case we place two triangular crystals of size (12a)(13)$[(\sqrt{3})/2]$a either at the left and right domain edge (Design A and Design C) or at the left and top (rotated by 90 degrees) (Design B). Curved sections are created by defining a path between the central row of the crystals according the respective function and by decorating the path and 7 layers of offset curves either side according to Approach #3. Together the crystal and curved section are declared a set of fixed points $N_{fixed}$. The number of movable points is thus $N_{movable}=N_{total}-N_{fixed}-N_{movable}$ points are now distributed randomly in the domain. We apply a repulsive $r^{-4}$ potential with respect to all points under periodic boundary conditions, but only allow the movable points to uniformize.

We apply to the point pattern the network protocol described in the following two references: M. Florescu, S. Torquato, and P. J. Steinhardt, "Designer disordered materials with large complete photonic band gaps," Proc. Natl. Acad. Sci. U.S.A., vol. 106, no. 49, pp. 20658-20663, 2009 and M. Florescu, S. Torquato, and P. J. Steinhardt, "Complete band gaps in two-dimensional photonic quasicrystals," Phys. Rev. B—Condens. Matter Mater. Phys., vol. 80, 2009. The wall width is set to 0.4a (184 nm) and the slab height to 0.478a (220 nm). The cells along the waveguide path are filled with dielectric. Input and output strip waveguides of width, $(\sqrt{3})/2a$ (398 nm) are placed at the beginning and end. The structure is placed in a FDTD domain of 45a×45a× 3.65a. A mode source is used to launch the fundamental (even) TE mode of the strip input waveguide.

Figure 15:
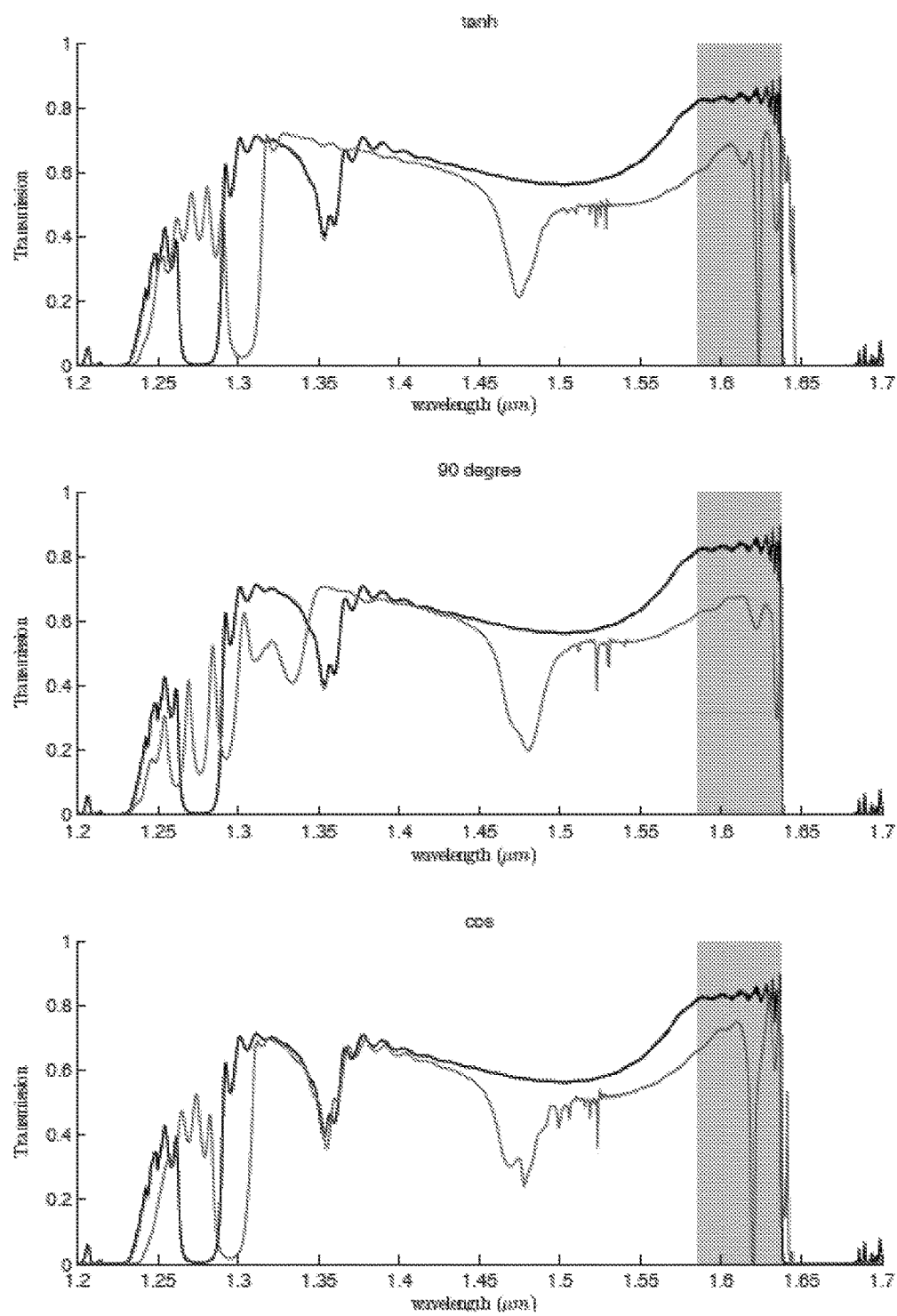
FIG. 15 shows the spectral transmission as a function of wavelength for our three designs, in accordance with an embodiment of the disclosure.

FIG. 15 shows the spectral transmission as a function of wavelength for our three designs. We observe significant transmission up to around 70% compared to 80% obtained for the straight waveguide, i.e. 13% loss, in the low loss transmission window. Some resonance anomalies associated with these curved waveguides are observed at longer wavelengths. At these wavelengths the dispersion of the straight waveguide flattens out and thus the group velocity is much slower. This substantially slowed group velocity could in some applications be used to advantage, while in other applications it might be preferred to eliminate the dispersion via further optimization in the vicinity of the waveguide. Using these structures as a starting point for further numerical optimizations well-known to individuals skilled in the art, transmission spectra closely approaching that for the straight waveguides is expected.

FIG. 15: Transmission spectra for an ordinary straight honeycomb photonic crystal waveguide (black), a straight waveguide with 7 triangular lattice layers embedded in a near-hyperuniform background (red) and a waveguide bent at a 90 degree angle with a radius r=4(√3). From top to bottom in this figure are the transmission spectra corresponding to 90 degree bends described in Designs A (labelled here as tan h), B (labelled here as 90 degree), and C (labelled here as cos) respectively, embedded in a near-hyperuniform background. The grey-shaded region (blue-shaded in associated journal publication) is the low-loss window for the straight waveguide. Further improvements are expected to accrue to the transmission spectra of the bent waveguides upon application of further numerical optimizations.

In summary, we have proposed and demonstrated a novel design strategy for non-straight waveguides in disordered honeycomb type structures. A particularly interesting result is that we connected two triangular lattices M-direction W1 waveguides around a 90° bend, an angle not naturally provided in the case of the regular, periodic triangular crystal. Our initial designs have shown that transmission is possible in the low loss transmission window of the regular photonic crystal. This is highly relevant to the field of sub-wavelength structured materials especially since we have shown this for 220 nm silicon membrane technology around 1.6 μm. These length scales are not only relevant for photonics applications, but also for phononic, phoxonic and opto-mechanical applications where simultaneous localization and guiding of light and sound waves is achieved, such as described in "Photonic Band Gap Optomechanical Crystal Cavity," by Safavi-Naeini et al, Phys. Rev. Lett., 2010. Structures based on this approach are promising templates which, when used as starting points for further optimization, can lead to very high performing integrated optical microcircuits, providing a generalized design platform for compact, PBG-based PICs.

Expanded control over the flow of light can have a great impact on all-optical switching as referenced for example in "Resonance fluorescence in photonic band gap waveguide architectures: Engineering the vacuum for all-optical switching," by Florescu and John, Phys Rev A, 2004; implementations of linear-optical quantum information processors as described for example in "Exploiting the Quantum Zeno effect to beat photon loss in linear optical quantum information processors," by Spedalieri et al., Optics Communications, 2005; single-photon sources, optical computing, and lab-on-chip metrology.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described.

Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical structure comprising:
   a Hyperuniform Disordered Solid ("HUDS") structure formed by walled cells organized in a lattice;
   a waveguide configured to guide an optical signal; and
   a resonant cavity formed along a boundary of the waveguide, wherein the resonant cavity is configured to be resonant at a frequency band that is a subset of a bandwidth of the optical signal.

2. The optical structure of claim 1, wherein the resonant cavity is defined by an enlarged hole in the lattice that is larger than a hole size of any one of the walled cells in a defect-free portion of the lattice.

3. The optical structure of claim 1, wherein the resonant cavity includes at least one of the walled cells of the lattice being a filled or partially-filled cell.

4. The optical structure of claim 1, wherein the resonant cavity is formed by shifting the center position of one or more holes.

5. The optical structure of claim 1 further comprising an adjusted interface disposed between the HUDS structure and the waveguide, wherein boundaries of the waveguide enclose walled interface cells that contact the waveguide, the walled interface cells included in the adjusted interface.

6. The optical structure of claim 1, wherein the resonant cavity and the waveguide are configured to block the frequency band and pass the remaining bandwidth of the optical signal through the waveguide.

7. The optical structure of claim 1, wherein the lattice is formed of a semiconductor material, and wherein the walled cells enclose voids in the semiconductor material.

8. The optical structure of claim 7, wherein the semiconductor material includes silicon.

9. The optical structure of claim 7, wherein the semiconductor material includes a III-V material.

10. The optical structure of claim 7, wherein the voids are filled with gaseous matter.

11. The optical structure of claim 7, wherein the voids are a vacuum.

12. The optical structure of claim 7, wherein the voids are filled with an oxide.

13. The optical structure of claim 7, wherein the voids are filled with a nitride.

14. The optical structure of claim 1, wherein each of the walled cells surrounds a fill material that differs from a material that forms the walled cells.

15. The optical structure of claim 14, wherein a first index of refraction of the fill material and a second index of refraction of the material that forms the walled cells have an oppositely-signed dependence of index of refraction on temperature.

16. The optical structure of claim 15, wherein the fill material includes silicon, and wherein the material that forms the walled cells is a semiconductor material.

17. An optical structure comprising:
a Hyperuniform Disordered Solid ("HUDS") structure formed by walled cells organized in an aperiodic hyperuniform disordered structure, the aperiodic hyperuniform disordered structure being neither periodic, quasiperiodic, not periodic on average;
a waveguide with smooth boundaries; and
an adjusted interface disposed between the HUDS structure and the waveguide, wherein the smooth boundaries of the waveguide enclose walled interface cells disposed along the smooth boundaries of the waveguide, the walled interface cells disposed within the adjusted interface.

18. The optical structure of claim 17, wherein the waveguide is in a plane of HUDS structures.

19. The optical structure of claim 17, wherein the waveguide is oriented perpendicular to a plane of the HUDS.

20. A system comprising:
an input port to receive incoming optical communication signals;
an output port to transmit outgoing optical communication signals; and
a waveguide optically coupled between the input port and the output port, the waveguide comprising:
an unstructured solid region having smooth boundaries configured to guide the incoming optical communication signals;
a Hyperuniform Disordered Solid ("HUDS") structure formed by walled cells organized in an aperiodic hyperuniform disordered structure, the aperiodic hyperuniform disordered structure being neither periodic, quasiperiodic, not periodic on average; and
an adjusted interface disposed between the HUDS structure and the waveguide, wherein the cells of the HUDS are adjusted to conform to the smooth boundary of the waveguide.

* * * * *